US009116859B2

(12) United States Patent
Tanoue et al.

(10) Patent No.: US 9,116,859 B2
(45) Date of Patent: Aug. 25, 2015

(54) DISK ARRAY SYSTEM HAVING A PLURALITY OF CHASSIS AND PATH CONNECTION METHOD

(75) Inventors: Tomoki Tanoue, Odawara (JP); Hiroshi Suzuki, Sagamihara (JP); Tetsuya Inoue, Odawara (JP)

(73) Assignee: HITACHI, LTD., Tokyo (JP)

( * ) Notice: Subject to any disclaimer, the term of this patent is extended or adjusted under 35 U.S.C. 154(b) by 389 days.

(21) Appl. No.: 13/575,224

(22) PCT Filed: Jul. 17, 2012

(86) PCT No.: PCT/JP2012/004561
§ 371 (c)(1),
(2), (4) Date: Jul. 25, 2012

(87) PCT Pub. No.: WO2014/013521
PCT Pub. Date: Jan. 23, 2014

(65) Prior Publication Data
US 2014/0025886 A1 Jan. 23, 2014

(51) Int. Cl.
*G06F 11/20* (2006.01)
*G06F 11/10* (2006.01)

(52) U.S. Cl.
CPC .......... *G06F 11/201* (2013.01); *G06F 11/1076* (2013.01); *G06F 11/2089* (2013.01); *G06F 2211/1059* (2013.01)

(58) Field of Classification Search
USPC .......................................... 711/114, E12.019
See application file for complete search history.

(56) References Cited

U.S. PATENT DOCUMENTS

| | | | | |
|---|---|---|---|---|
| RE42,860 E | * | 10/2011 | Velez-McCaskey et al. | 710/5 |
| 2009/0094620 A1 | * | 4/2009 | Kalwitz et al. | 719/325 |
| 2009/0204743 A1 | | 8/2009 | Inoue et al. | |
| 2009/0271645 A1 | * | 10/2009 | Mori | 713/320 |
| 2011/0179234 A1 | | 7/2011 | Kanayama et al. | |
| 2012/0259944 A1 | * | 10/2012 | Fukuguchi et al. | 709/217 |
| 2013/0070415 A1 | * | 3/2013 | Terry | 361/679.38 |

* cited by examiner

*Primary Examiner* — Mardochee Chery
(74) *Attorney, Agent, or Firm* — Volpe and Koenig, P.C.

(57) ABSTRACT

According to the conventional art disk array system, when a drive box of a first chassis is blocked, all the drive boxes of a second chassis connected subsequently therefrom will be blocked, and the data in the drive boxes arranged subsequently therefrom cannot be recovered based on the RAID configuration. Even if the data could be recovered based on RAID configuration, it is necessary to perform the recovery process based on RAID in all the subsequently arranged drive boxes, according to which the performance is deteriorated. The present system stores a first drive box in a first chassis out of a plurality of chassis, and a second drive box and a third drive box are stored in a second chassis. One of a plurality of expander controllers within the first drive box is connected to an expander controller in the second drive box, and the other expander controller is connected to an expander controller in the third drive box.

12 Claims, 23 Drawing Sheets

| Chassis# | Drive BOX# | Expander# | Determination Result |
|---|---|---|---|
| 0 | 0 | 1 | Normal |
| 0 | 0 | 2 | Normal |
| 0 | 1 | 1 | Normal |
| 0 | 1 | 2 | Normal |
| ⋮ | ⋮ | ⋮ | ⋮ |
| 0 | M | 1 | Normal |
| 0 | M | 2 | Normal |
| 1 | 0 | 1 | Failure |
| 1 | 0 | 2 | Normal |
| ⋮ | ⋮ | ⋮ | ⋮ |
| N | M | 1 | Normal |
| N | M | 2 | Normal |

Determination result: Normal/Failure/Disabled/Status Unknown

Fig.10

| Chassis#. | Drive BOX# | Expander# | Determination Result |
|---|---|---|---|
| 0 | 0 | 1 | Normal |
| 0 | 0 | 2 | Normal |
| 0 | 1 | 1 | Normal |
| 0 | 1 | 2 | Normal |
| 0 | 2 | 1 | Normal |
| 0 | 2 | 2 | Normal |
| 0 | 3 | 1 | Normal |
| 0 | 3 | 2 | Normal |
| 1 | 0 | 1 | Normal |
| 1 | 0 | 2 | Normal |
| 1 | 1 | 1 | Normal |
| 1 | 1 | 2 | Normal |
| 1 | 2 | 1 | Failure |
| 1 | 2 | 2 | Failure |
| 1 | 3 | 1 | Normal |
| 1 | 3 | 2 | Normal |
| 2 | 0 | 1 | Normal |
| 2 | 0 | 2 | Normal |
| 2 | 1 | 1 | Normal |
| 2 | 1 | 2 | Normal |
| 2 | 2 | 1 | Disabled / Status Unknown |
| 2 | 2 | 2 | Disabled / Status Unknown |
| 2 | 3 | 1 | Normal |
| 2 | 3 | 2 | Normal |

Determination result: Normal/Failure/Disabled/Status Unknown

Fig.12

| Chassis#. | Drive BOX# | Expander# | Determination Result |
|---|---|---|---|
| 0 | 0 | 1 | Normal |
| 0 | 0 | 2 | Normal |
| 0 | 1 | 1 | Normal |
| 0 | 1 | 2 | Normal |
| 0 | 2 | 1 | Normal |
| 0 | 2 | 2 | Normal |
| 0 | 3 | 1 | Normal |
| 0 | 3 | 2 | Normal |
| 1 | 0 | 1 | Normal |
| 1 | 0 | 2 | Normal |
| 1 | 1 | 1 | Normal |
| 1 | 1 | 2 | Normal |
| 1 | 2 | 1 | Failure |
| 1 | 2 | 2 | Failure |
| 1 | 3 | 1 | Normal |
| 1 | 3 | 2 | Normal |
| 2 | 0 | 1 | Normal |
| 2 | 0 | 2 | Normal |
| 2 | 1 | 1 | Normal |
| 2 | 1 | 2 | Normal |
| 2 | 2 | 1 | Disabled |
| 2 | 2 | 2 | Normal |
| 2 | 3 | 1 | Normal |
| 2 | 3 | 2 | Disabled |

Determination result: Normal/Failure/Disabled/Status Unknown

Fig.14

| Chassis#. | Drive BOX# | Expander# | Determination Result |
|---|---|---|---|
| 0 | 0 | 1 | Normal |
| 0 | 0 | 2 | Normal |
| 0 | 1 | 1 | Normal |
| 0 | 1 | 2 | Normal |
| 0 | 2 | 1 | Normal |
| 0 | 2 | 2 | Normal |
| 0 | 3 | 1 | Normal |
| 0 | 3 | 2 | Normal |
| 1 | 0 | 1 | Normal |
| 1 | 0 | 2 | Normal |
| 1 | 1 | 1 | Normal |
| 1 | 1 | 2 | Normal |
| 1 | 2 | 1 | Failure |
| 1 | 2 | 2 | Failure |
| 1 | 3 | 1 | Normal |
| 1 | 3 | 2 | Normal |
| 2 | 0 | 1 | Normal |
| 2 | 0 | 2 | Normal |
| 2 | 1 | 1 | Normal |
| 2 | 1 | 2 | Normal |
| 2 | 2 | 1 | Disabled |
| 2 | 2 | 2 | Failure |
| 2 | 3 | 1 | Normal |
| 2 | 3 | 2 | Disabled |

Determination result: Normal/Failure/Disabled/Status Unknown

Fig.21

| No. | Connection Method | Range of influence of power blackout (Power blackout of single Drive BOX, power blackout of one SIDE of SBX in Fig. 3) | | | Range of operation of correction copy (range of deterioration of performance) | Pinpoint failure / Pinpoint two-point failure | Cable routing difficulty level |
|---|---|---|---|---|---|---|---|
| | | Blockage section of all ports | One side port blockage section | RAID group blockage (RAID5) | | | |
| 1 | Fig. 1 (Fig. 11) | Relevant Drive BOX | All subsequent stages of relevant Drive BOX | None | Relevant chassis | Possible / Possible | Difficult |
| 2 | Fig. 16 | Relevant Drive BOX | All subsequent stages of relevant Drive BOX & one side of all adjacent Drive BOXes | None | Relevant chassis | Possible / Possible | Somewhat easy |
| 3 | Fig. 17/Fig. 20 | Relevant Drive BOX & all subsequent stages | One side of all adjacent Drive BOXes | None | Relevant chassis & all subsequent stages | Not possible / Not possible | Somewhat easy |
| 4 | Fig. 18 | Relevant Drive BOX & single Drive BOX | All subsequent stages of relevant Drive BOX & one side of all adjacent Drive BOXes | None | 2 Chassis | Possible / Possible | Difficult |
| 5 | Fig. 19 | Relevant Drive BOX | All subsequent stages of relevant Drive BOX & one side of all adjacent Drive BOXes | None | Relevant chassis | Possible / Not possible | Somewhat easy |
| 6 | Fig. 2 (Conventional Art) | Relevant Drive BOX & all subsequent stages | None | None | Relevant chassis & all subsequent stages | Not possible / Not possible | Easy |
| 7 | Fig. 3 (Conventional Art) | One side of relevant SBX & all subsequent stages | None | Present | System failure | Not possible / Not possible | Easy |

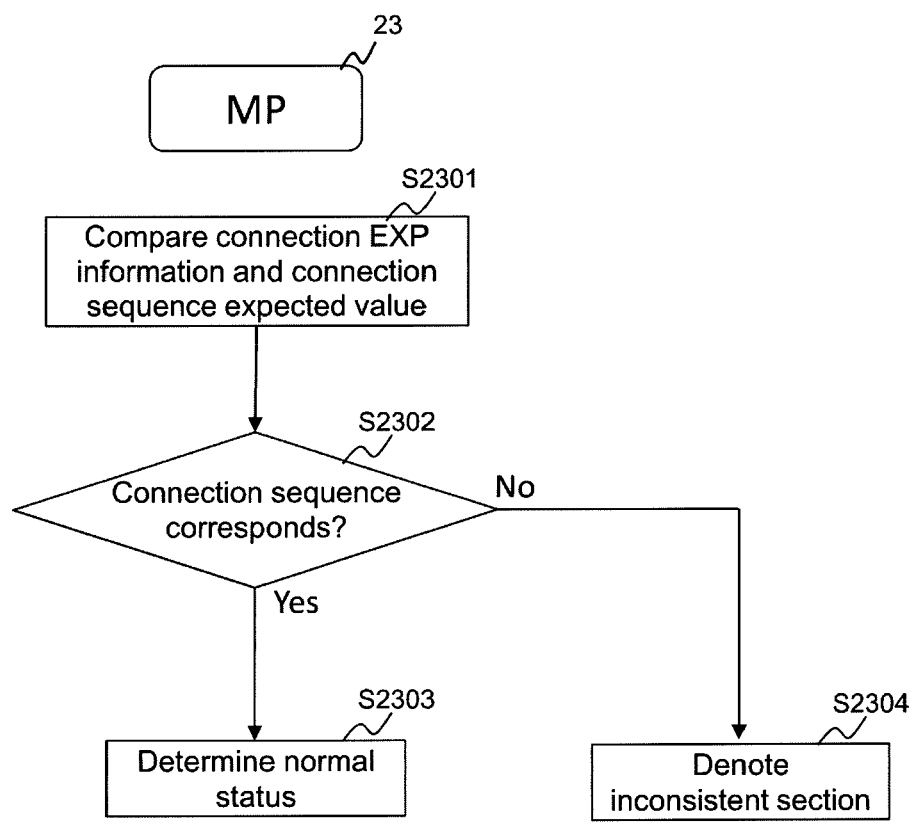

DISK ARRAY SYSTEM HAVING A PLURALITY OF CHASSIS AND PATH CONNECTION METHOD

TECHNICAL FIELD

The present invention relates to a disk array system and a connection method.

BACKGROUND ART

Patent literature 1 discloses a storage subsystem including a first controller for controlling multiple drive units connected via multiple first switch devices, and a second controller for controlling the multiple drive units connected via multiple second switch devices associated with the multiple first switch devices, wherein the storage subsystem also includes a connection path that mutually connects the multiple first switch devices and the corresponding multiple second switch devices.

According further to the storage subsystem disclosed in patent literature 1, when the storage subsystem detects occurrence of a failure, it identifies the failure section in the connection path, and changes the connection configuration of the switch device so as to circumvent the failure section.

In other words, switch devices connected in a daisy chain mode are mutually connected between pairs having a redundant configuration, and when failure occurs, the connection configuration is rearranged so as to circumvent the section in which failure has occurred.

Further, patent literature 2 discloses coupling the pairs having a redundant configuration of switch devices coupled in a daisy chain mode in different orders.

As described, according to the conventional art, the two paths connected to an expander controller having a redundant configuration within a drive box composed of the drive unit and the expander controller are both connected in a daisy chain mode to the expander controllers in the subsequently arranged drive box.

CITATION LIST

Patent Literature

PTL 1: United States Patent Application Publication No. 2009/0204743
PTL 2: United States Patent Application Publication No. 2011/0179234

SUMMARY OF INVENTION

Technical Problem

According to the conventional art path connection method, when a drive box is blocked, all the subsequently arranged drive boxes connected to the drive box blocked due to failure will be blocked. Therefore, depending on the configuration of the RAID group that the subsequently arranged drive boxes constitute, the data in the subsequently arranged drive boxes may not be recovered based on the RAID group configuration.

Moreover, even if the data could be recovered based on the RAID group configuration, the recovery processing based on the RAID group configuration is required to be performed in all the subsequently arranged drive boxes, according to which the performance will be deteriorated.

Therefore, the present invention provides a disk array system in which when failure occurs to a drive box and the drive box is blocked, the drive boxes arranged subsequently therefrom can be accessed via expander controllers of drive boxes other than the blocked drive box.

Solution to Problem

In order to solve the problems of the conventional art, the present invention provides a disk array system comprising a controller unit having a plurality of redundant controllers; and a storage unit having a plurality of chassis connected in daisy chain mode, each chassis storing a plurality of drive boxes having a plurality of redundant expander controllers, wherein out of the plurality of chassis, a first chassis stores a first drive box, and a second chassis stores a second drive box and a third drive box.

Further, one of a plurality of expander controllers in the first drive box is connected to an expander controller in the second drive box, and the other one of the expander controllers is connected to an expander controller in the third drive box.

Advantageous Effects of Invention

According to the disk array system of the present invention, it is possible to prevent all the subsequently arranged drive boxes from being blocked when failure occurs to a drive box, and further, the reliability and the availability of the whole disk array system can be improved. Problems, configurations and effects other than those mentioned above will become apparent from the following description of the preferred embodiments.

BRIEF DESCRIPTION OF DRAWINGS

FIG. 10 is a view illustrating the state of failure determination table when failure occurs according to the conventional art connection method.

FIG. 12 is a view illustrating the state of failure determination table when one-point failure occurs according to a first path connection method for narrowing the failure range.

FIG. 14 is a view illustrating the state of the failure determination table when two-point failure occurs according to the first path connection method for narrowing the failure range.

FIG. 21 is a comparison view for describing the merits and demerits of each path connection method.

FIG. 23 is a flowchart showing the comparison process of the expected value of connection patterns.

DESCRIPTION OF EMBODIMENTS

Figure 1:
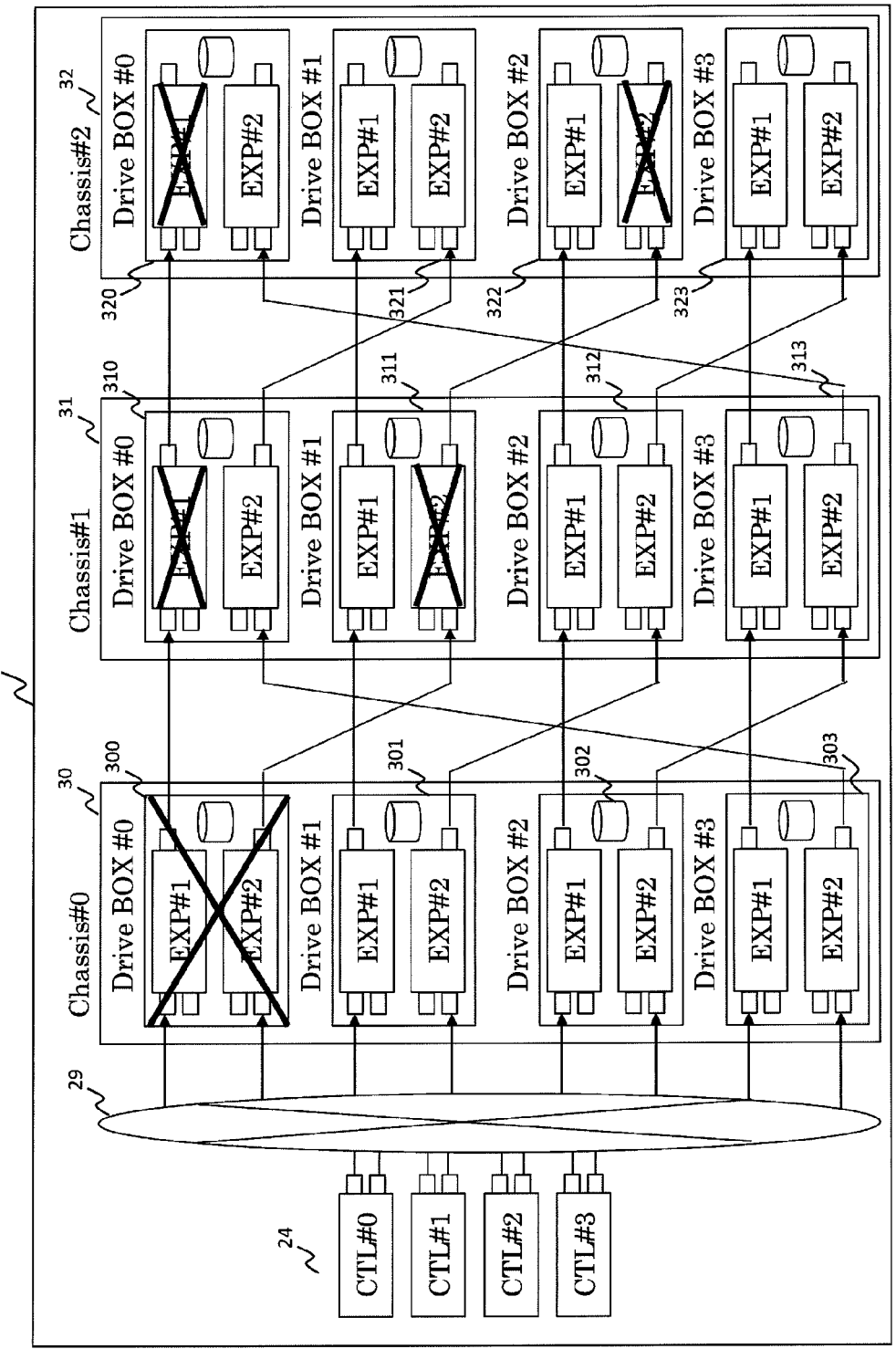
FIG. 1 is a view illustrating one example of a path connection method for narrowing the failure range according to the present invention.

Now, the preferred embodiments of the present invention will be described with reference to the drawings. In the following description, various information are referred to as "management table" and the like, but the various information can also be expressed by data structures other than tables. Further, the "management table" can also be referred to as "management information" to show that the information does not depend on the data structure.

The processes are sometimes described using the term "program" or "tool" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports).

The processor can have a dedicated hardware in addition to the CPU. The computer program can be installed to each computer from a program source. The program source can be provided via a program distribution server or storage media, for example.

Each element, such as each CTL (controller), can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of the components can be one or more than one unless defined otherwise.

Outline of the Invention

Figure 2:
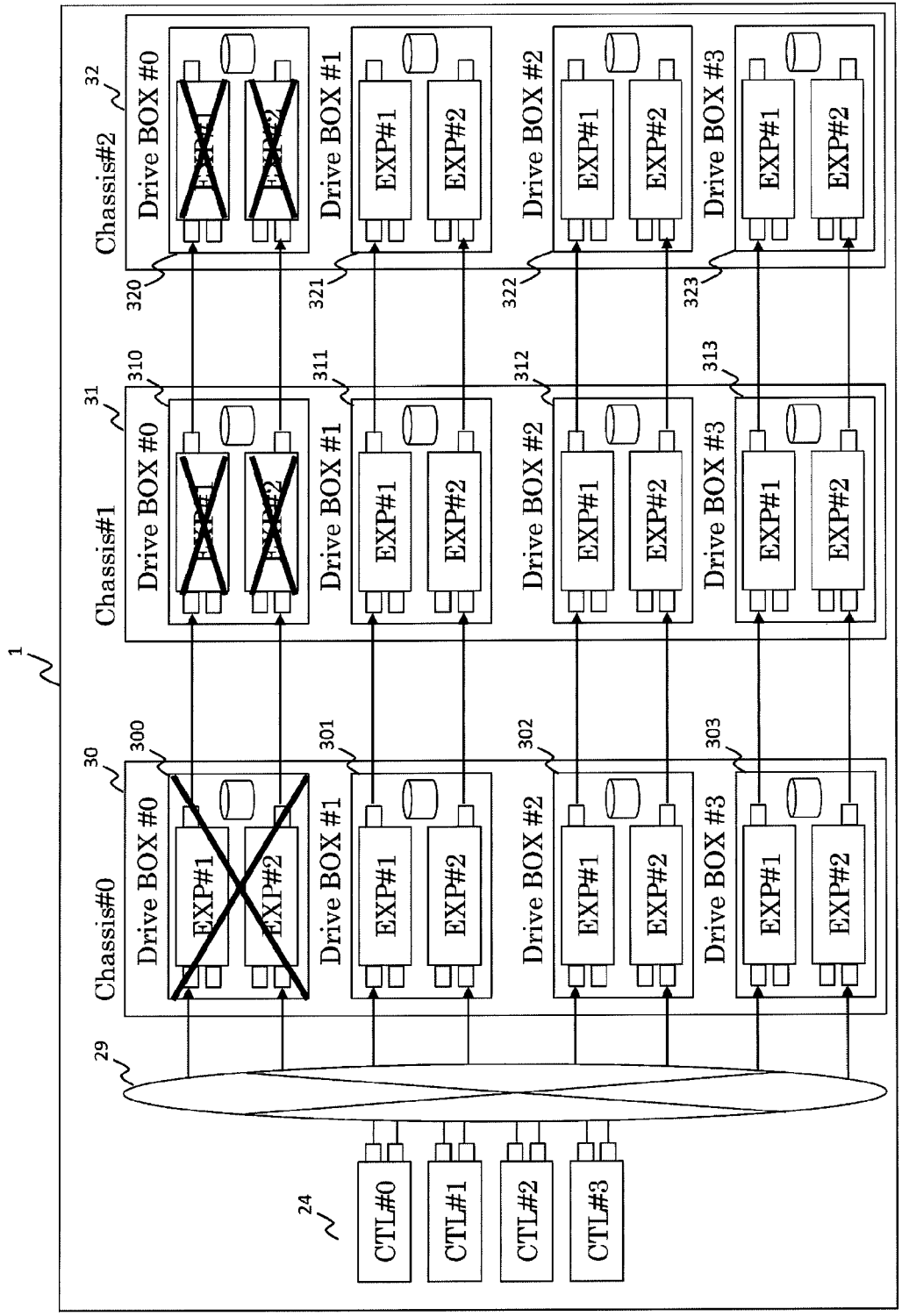
FIG. 2 is a view illustrating the problems of a path connection method according to the conventional art.
Figure 3:
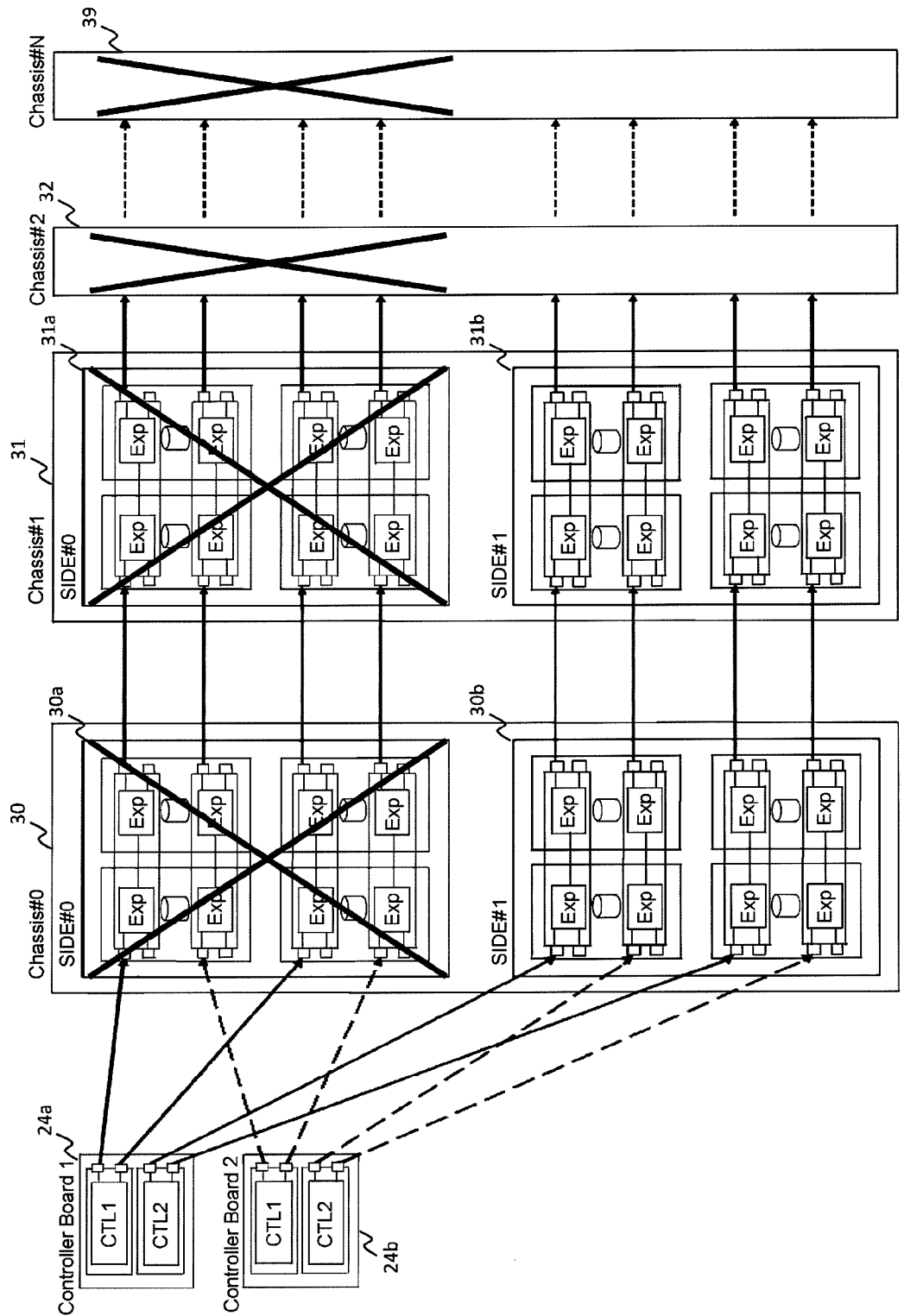
FIG. 3 is a view illustrating the problems of a path connection method according to the conventional art.

FIG. 1 is a view illustrating one example of a path connection method for narrowing a failure range according to the present invention. FIGS. 2 and 3 illustrate problems of the path connection method according to the conventional art.

As shown in FIG. 1, a disk array system is composed of a disk controller section including controllers (CTL) 24 and the like, and a disk unit section composed of one or more chassis 30, 31 and 32 including a plurality of disk drives.

The disk unit section constitutes RAID groups to ensure failure tolerance. However, there are cases where failure recovery is not possible even when RAID groups are constituted, depending on the range of influence of the failure.

In order to ensure high reliability, it is necessary to prevent any failure that may prevent RAID groups from being formed. Further, even when failure recovery based on RAID groups is enabled, the failure tolerance based on RAID groups cannot be ensured until the failure recovery process is completed, so that in order to ensure high reliability, it is necessary to narrow the failure range.

As shown in FIG. 1, the present invention provides a path connection method capable of narrowing the failure range when failure occurs. The details of the present invention will be described later. In the present invention, the connection between EXPs is called path connection.

The problems of the conventional art connection method will be described with reference to FIGS. 2 and 3.

According to the connection method of FIG. 2, controllers within a controller unit section (CTL 24: CTL #0 to CTL #3) and an expander board (EXP) of a drive box belonging to chassis #0 30 on the first stage are connected via a switch 29. The switch 29 is a mere example of a device for connecting the respective controllers and respective EXPs, and the connection method, the connection means and the connection statuses for connecting the respective controllers and respective EXPs can be determined arbitrarily.

Each of the drive boxes of chassis #0 30 are connected in a cascade (daisy chain) with respective drive boxes of chassis #1 31 arranged subsequently therefrom, and such cascade (series) connection is performed repeatedly until chassis #N is connected.

Two EXPs are arranged in a single drive box, and each EXP is designed to access each port of a storage drive. Each drive box has a power supply unit.

In the connection method shown in FIG. 3, controllers (CTL) of controller boards 24a and 24b are connected to EXPs of SIDE #0 30a and SIDE #1 30b belonging to chassis #0 30 on the first stage.

Two EXPs are connected in a cascade within the same chassis #0 30, and the EXPs on the second stage are respectively connected to EXPs on the first stage within chassis #1 31 arranged subsequently therefrom, wherein similar connection is performed repeatedly until chassis #N 39 is connected. Each SIDE is equipped with a power supply unit.

The problems according to the conventional art path connection method illustrated in FIG. 2 and FIG. 3 are the five points listed in (1) to (5) below.

(1) During failure, a section where failure recovery based on RAID groups is impossible may be caused.

In the connection method illustrated in FIG. 2, if a RAID5 (7D+1P) configuration is formed in the drive boxes within chassis #N and chassis #(N+1), when a drive box arranged prior to the chassis #(N+1) is blocked due to power supply stoppage (hereinafter called power blackout) caused by power supply unit failure or the like, all the drive boxes connected subsequently to the drive box in which failure has occurred will be blocked.

For example, if the drive box #0 300 of the chassis #0 30 is blocked due to power blackout or the like, the subsequently-arranged drive box #0 310 of chassis #1 31 and the drive box #0 320 of chassis #2 32 will also be blocked. Although not shown, if chassis of M units are connected in a cascade, all the drive boxes #0 of chassis from the third stage to the Mth stage will be blocked and cannot be used even if the drive boxes #0 themselves do not have any failure.

Therefore, 2D, that is, the two storage drives (storage drives of drive box #0 300 of chassis #0 30 and drive box #0 310 of chassis #1 31) will all be disabled within the RAID group including the failure-occurrence drive box and all the RAID groups arranged subsequently therefrom, according to which failure recovery based on RAID groups is disabled.

Further, according to the connection method of FIG. 3, when RAID5 (3D+1P or 7D+1P) is formed within the chassis, if one SIDE is blocked due to power blackout or the like (in an unusable state), the one SIDE of all the subsequently connected stages will be blocked.

Therefore, 4D, that is, four storage drives, will be disabled within the failure-occurrence chassis and all the chassis arranged subsequently therefrom, according to which failure recovery based on RAID groups is disabled.

(2) When failure occurs, the range of deterioration of failure tolerance based on RAID groups is spread widely.

According to the connection method illustrated in FIG. 2, when drive boxes #0 to #3 within a single chassis constitute RAID5 (3D+1P), if a single drive box is blocked due to failure such as power blackout, all the drive boxes connected subsequently to the failure-occurrence drive box are blocked. Therefore, 1D, that is, one storage drive, will be disabled in the RAID group including the failure-occurrence drive box and all the subsequently arranged RAID groups, according to which RAID-group-levels failure tolerance is lost.

(3) The range in which performance deterioration occurs is expanded by executing a failure recovery process.

In order to recover the failure of (2), it is necessary to execute a failure recovery process (correction copy) in the RAID group including the failure-occurrence drive box and all the subsequently arranged RAID groups, according to which the access performance for accessing the disk array system will be deteriorated.

(4) Range of allocation of spare disks during the failure recovery process is expanded.

In order to recover the failure of (2), it is necessary to execute the failure recovery process (correction copy) in the RAID group including the failure-occurrence drive box and all the subsequently arranged RAID groups, according to which the amount of drive boxes required to be allocated to spare disks is increased. For example, in a disk array system in which four chassis are connected, four drive boxes are required to be allocated to spare disks.

(5) The status of the drive boxes connected subsequently to the failure-occurrence drive box will be unknown until failure recovery is performed.

Since there is no path accessible to the drive boxes connected subsequently to the failure occurrence drive box, the statuses of drive boxes subsequently connected to the failure occurrence drive box will be unknown.

In order to cope with the problems listed above, the present invention enhances the failure tolerance by changing the connection destination of EXP #1 and EXP #2 when connecting the drive boxes of chassis #N and chassis #(N+1) as shown in FIG. 1.

According to the connection of EXPs #1 for connecting the drive box belonging to chassis #N to the drive box belonging to chassis #(N+1), the cascade connection is performed to connect drive boxes #M having the same box number. M is a value of 0 to 3.

That is, the EXP #1 of drive box #0 300 of chassis #0 30 is connected to the EXP #1 of drive box #0 310 of chassis #1 31.

Similarly, the EXP #1 of the drive box #1 301 of chassis #0 30 is connected to the EXP #1 of the drive box #1 311 in chassis #1 31. The cascade connection is performed in the same manner until drive box #3 303 in chassis #0 30 is connected. Such mutual connection of EXPs #1 is performed until chassis #N is connected.

Further, in the connection of EXP #2, the drive box #3 belonging to chassis #N and the drive box #0 belonging to chassis #(N+1) are connected.

As for the mutual connection of EXP #2 other than the above, the drive box #M belonging to chassis #N and the drive box #(M+1) belonging to chassis #(N+1) are connected. Incidentally, M is a value of 0 to 2.

In other words, the EXP #2 of drive box #3 303 of chassis #0 30 is connected to the EXP #2 of drive box #0 in chassis #1 31.

Similarly, the EXP #2 of drive box #0 300 in chassis #0 30 is connected to the EXP #2 of the drive box #1 311 in chassis #1 31. Thereafter, cascade connection is performed in the same manner until drive box #2 302 in chassis #0 30 is connected. The mutual connection of EXPs #2 is performed until chassis #N in the final stage is connected.

Even according to such path connection method, for example, if the drive box #0 300 of chassis #0 30 is blocked due to power blackout or the like, the EXP #1 of drive box #0 310 and the EXP #2 of drive box #1 311 of chassis #1 31 on the second stage are disabled. Similarly, the EXP #1 of the drive box #0 320 and the EXP #2 of the drive box #2 322 in chassis #2 32 on the third stage are also disabled.

However, according to the present invention, one of the EXPs, that is, the EXP #2 of the drive box #0 310 and the EXP #1 of the drive box #1 311 in chassis #1 31 on the second stage can be used. Similarly, the EXP #2 of the drive box #0 320 and the EXP #1 of the drive box #2 322 in chassis #2 32 on the third stage can also be used. Therefore, the aforementioned problems listed in (1) through (5) can be solved. The details are as follows.

Further, the CTL 24 and the chassis #0 30 of the first stage are connected by having each of the CTL #0 and CTL #1 connect to both the drive box #0 and drive box #1, and similarly, by having each of the CTL #2 and CTL #3 connect to both the drive box #2 and drive box #3.

Furthermore, the drive box #K of the chassis #0 on the first stage can be replaced with CTL, #K, which is connected to EXP #1 and EXP #2 of the chassis #1 31. For example, in consideration of the mutual connection method of chassis in FIG. 2 through the connection of CTL and chassis, both the ports of CTL #K are connected to the drive box #K (K is a value of 0 to 3).

Further, when considering the mutual connection method of chassis in FIG. 1 through the connection of CTL and chassis, one of the ports of CTL #K is connected to EXP #1 of drive box #K. The other port of CTL Inc is connected to EXP #2 of drive box # ((K+1) mode 4). K is a value of 0 to 3, and (K+1) mode 4 refers to a function for computing a remainder (natural number) of dividing the value of K+1 by 4, which is the number of drive boxes (number of drive boxes within the chassis).

<Configuration of Disk Array System>

Figure 4:
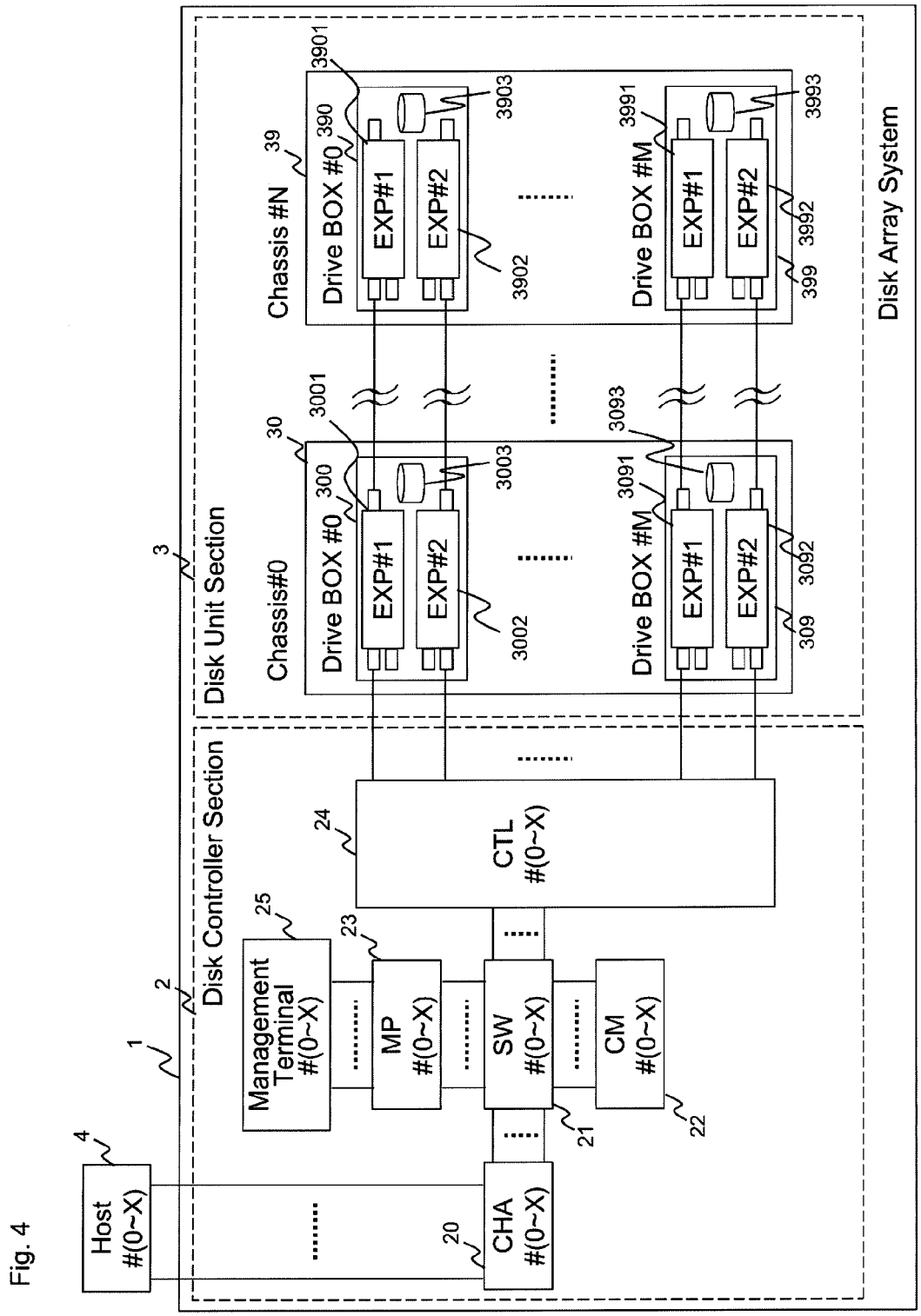
FIG. 4 is an overall configuration diagram of a disk array system using the path connection method for narrowing the failure range according to the present invention.

FIG. 4 is an overall configuration diagram of a disk array system using a path connection method for narrowing the failure range according to the present invention.

A disk array system 1 is coupled to a host computer (hereinafter referred to as host) 4, and stores the data of the host 4. Further, the disk array system 1 is composed of a disk controller section 2 and a disk unit section 3.

The disk controller section 2 is composed of a plurality of channel adapters (hereinafter referred to as CHA) 20, a plurality of switches (hereinafter referred to as SW) 21, a plurality of cache memories (hereinafter referred to as CM) 22, a plurality of microprocessors (hereinafter referred to as MP) 23, a plurality of controller boards (hereinafter referred to as CU) 24, and a plurality of management terminals 25, which compose a redundant configuration. Each configuration element is provided with an identification number of 0 to X.

The CHA 20 receives an I/O command (write command or read command) from the host 4 to the disk array system 1, and transfers the received I/O command to the MP 23. The SW 21 is a controller for connecting the CHA 20, the CM 22, the MP 23 and the CU 24.

The CM 22 is a memory device including a volatile memory such as a DRAM (Dynamic Random Access Memory) and/or a nonvolatile memory such as a flash memory. The write data from the host or various control information for controlling the disk array system are stored therein. The control information can be, for example, a failure determination table described later.

The MP 23 is a processor for controlling the whole disk controller section 2. The MP 23 connects to the management terminal 25 and acquires from the management terminal 25 the information entered from the user or the system administrator, or sends the aforementioned failure determination table and displays the same on the management terminal 25.

The CTL 24 has a plurality of controllers for connecting the disk controller section 2 and the disk unit section 3.

The hardware configuration of the management terminal 25 is the same as a general computer. The management terminal 25 is equipped with an MP, a memory composed of a volatile memory and/or a nonvolatile memory, an input device such as a keyboard, and an output device such as a display.

The disk unit section 3 is composed by connecting a plurality of chassis having a plurality of drive boxes. The drive box is composed of two EXPs and a plurality of storage drives. Each EXP has a plurality of ports.

The length and material of the cables used for path connection of CTL-EXP and EXP-EXP can be arbitrary, as long as the required signal quality is maintainable.

Further, the spare disk used during correction copy is selected from any of the storage drives of the drive boxes and allocated thereto.

The hardware configuration of the host 4 is similar to a general computer. That is, the host 4 is equipped with a communication interface, a volatile memory, a nonvolatile memory, and an MP connected thereto.

<Failure Detection Operation>

Next, we will describe a failure detection operation performed when failure occurs to the drive box. A failure detection operation is composed of a failure detection, a confirmation of failure section, and a failure determination. Further, the result of failure determination is managed by the failure determination table (FIG. 7) described later.

<Failure Detection Processing>

Figure 5:
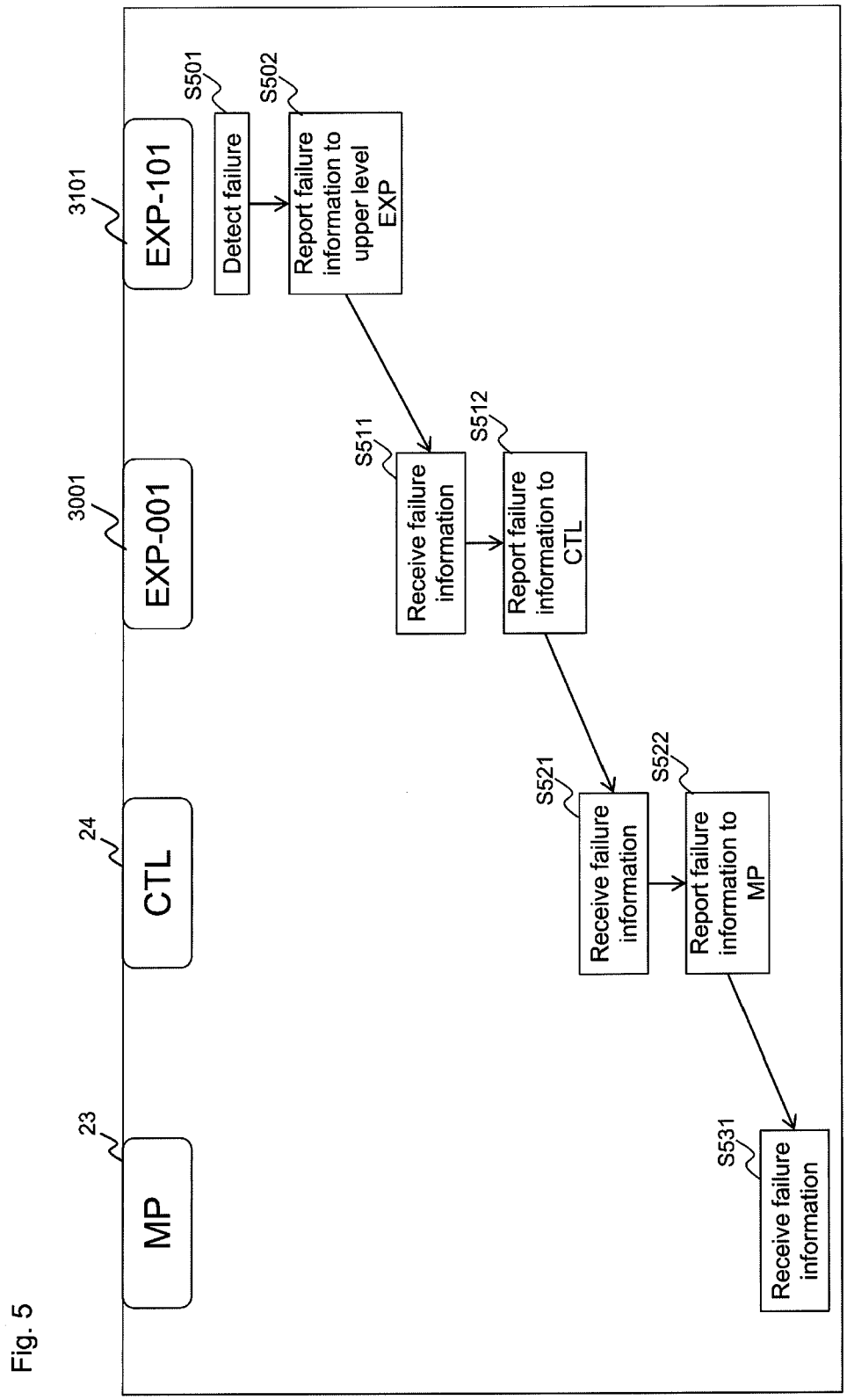
FIG. 5 is a flowchart showing the process of failure detection when failure occurs.

FIG. 5 is a flowchart showing the failure detection processing when failure occurs.

The failure information of FIG. 5 is notified from the EXP having detected failure to the CTL 24 and the MP 23 when EXP access disabled (power blackout, cable removal and EXP board removal) and EXP no response are detected.

Figure 6:
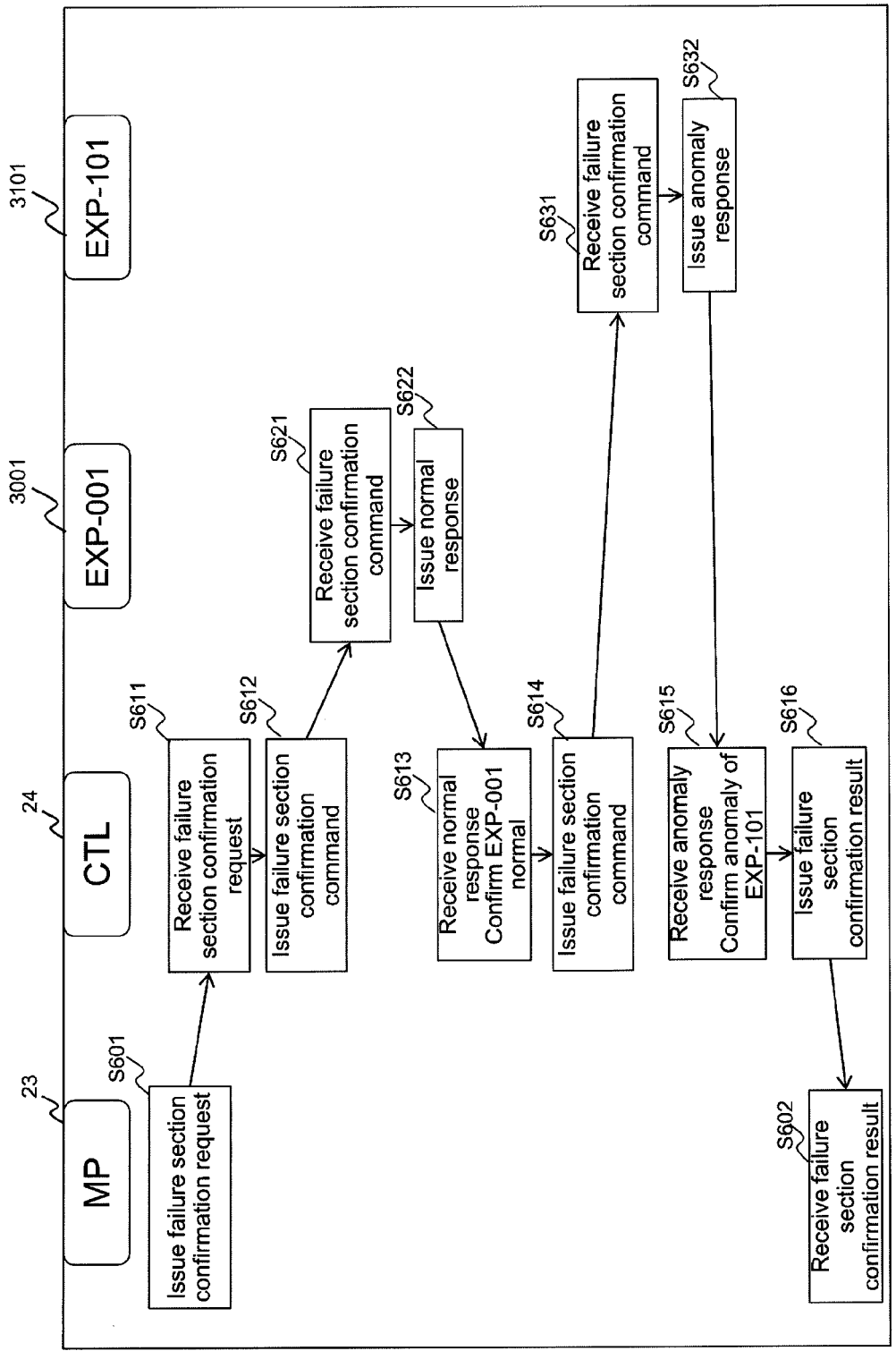
FIG. 6 is a flowchart showing the process of confirming the failure section when failure occurs.

However, the CTL 24 and the MP 23 are only enabled to detect that a failure has occurred to one of the EXPs connected thereto. Therefore, in order to specify the section of failure, a process of confirming the failure section as shown in FIG. 6 becomes necessary.

The failure detection processing of FIG. 5 when failure occurs is a detection method using SAS (Serial Attached SCSI) standard. According to SAS standard, when the SAS domain changes among specific ports (the status of EXP changes due to failure or the like), it is stated that a failure notice called Broadcast (Change) must be sent. Due to this failure notice called Broadcast (Change), the generation of failure can be determined.

The process for detecting the occurrence of failure will be described with reference to FIG. 5. According to the notation EXP-XYZ in the drawing, "X" refers to the chassis number, "Y" refers to the drive box number within the chassis, and "Z" refers to the EXP number within that drive box.

For example, EXP-101 represents EXP #1 of drive box #0 310 in chassis #1 31. Similarly, EXP-001 represents EXP #1 of drive box #0 300 in chassis #0 30. In other words, EXP-001 is an upper level EXP connected to a former stage of EXP-101.

At first, in S501, the EXP-101 3101 detects its own failure. This failure includes the aforementioned blackout and cable removal.

In S502, the EXP-101 3101 sends a failure information (failure notice: Broadcast (Change)) to notify the occurrence of failure to an upper level EXP, that is, the EXP-001 3001.

In S511, the EXP-001 3001 receives the failure information from the lower level EXP, that is, the EXP-101 3101.

In S512, the EXP-001 3001 sends the received failure information to the CTL 24.

In S521, the CTL 24 receives failure information from the EXP-001 3001.

In S522, the CTL 24 sends a report of the received failure information to the MP 23.

According to the above process, the disk controller section 2 can recognize that a failure has occurred to the disk unit section 3.

However, as mentioned earlier, according to SAS standard, there is no statement to notify a connection information indicating the failure section simultaneously as the Broadcast (Change). Therefore, it is only possible according to this failure detection process to detect that a failure has occurred.

Therefore, in order to specify the failure section, after notice of Broadcast (Change), the CTL 20 issues a Discover command to all EXPs. The connection information collected by issuing the Discover command are compared with expected values of connection information determined in advance, and the failure section is specified thereby. Next, the specification processing of the failure section will be described with reference to FIG. 6.

<Confirmation of Failure Section>

FIG. 6 is a view showing a flowchart of the process for confirming the failure section when failure occurs.

In S601, the MP 23 having detected the occurrence of failure issues a request to confirm the failure section to the CTL 24.

In S611, the CTL 24 receives the request to confirm the failure section from the MP 23.

In S612, the CTL 24 having received the request to confirm the failure section issues a failure section confirmation command (Discover command) to all EXPs. At first, the CTL 24 sends a failure section confirmation command to the EXP-001 3001.

In S621, the EXP-001 3001 receives a failure section confirmation command from the CTL 24.

In S622, the EXP-001 3001 determines its own operation status, and responds the determination result to the CTL 24. Since the EXP-001 3001 is operating normally, a normal response is issued to the CTL 24.

In S613, the CTL 24 receives a normal response from the EXP-001 3001, and confirms that the EXP-001 3001 is operating normally.

In S614, the CTL 24 issues a failure section confirmation command to the EXP-101 3101 via the normally operating EXP-001 3001 (or the EXP of the drive box connected to the EXP-101 3101).

In S631, the EXP-101 3101 receives a discover command which is a failure section confirmation command from the CTL 24.

In S632, the EXP-101 3101 determines its own operation status, and responds the determination result to the CTL 24. Failure has occurred in EXP-101 3101 and it is in an anomaly status, so that the EXP issues an anomaly response to the CTL 24.

In S615, the CTL 24 receives the anomaly response from the EXP-101 3101 via the EXP-001 3001 (or the EXP of the drive box connected to the EXP-101 3101), and confirms the anomaly of EXP-101 3101.

In S616, the CTL 24 assembles the results of acquired confirmation of the failure section of respective EXPs, and issues a confirmation result of failure section to the MP 23.

In S602, the MP 23 receives the result of confirmation of the failure section from the CTL 24.

According to the above-described failure section confirmation process, the disk controller section 2 can specify the section of the failure that has occurred in the disk unit section 3.

By simultaneously notifying the unique EXP information (such as the SAS address in a SAS standard) recognized by the MP 23 upon notifying the failure information, it becomes possible to specify the failure section, so that the failure section confirmation flow shown in FIG. 6 becomes unnecessary.

Figure 7:
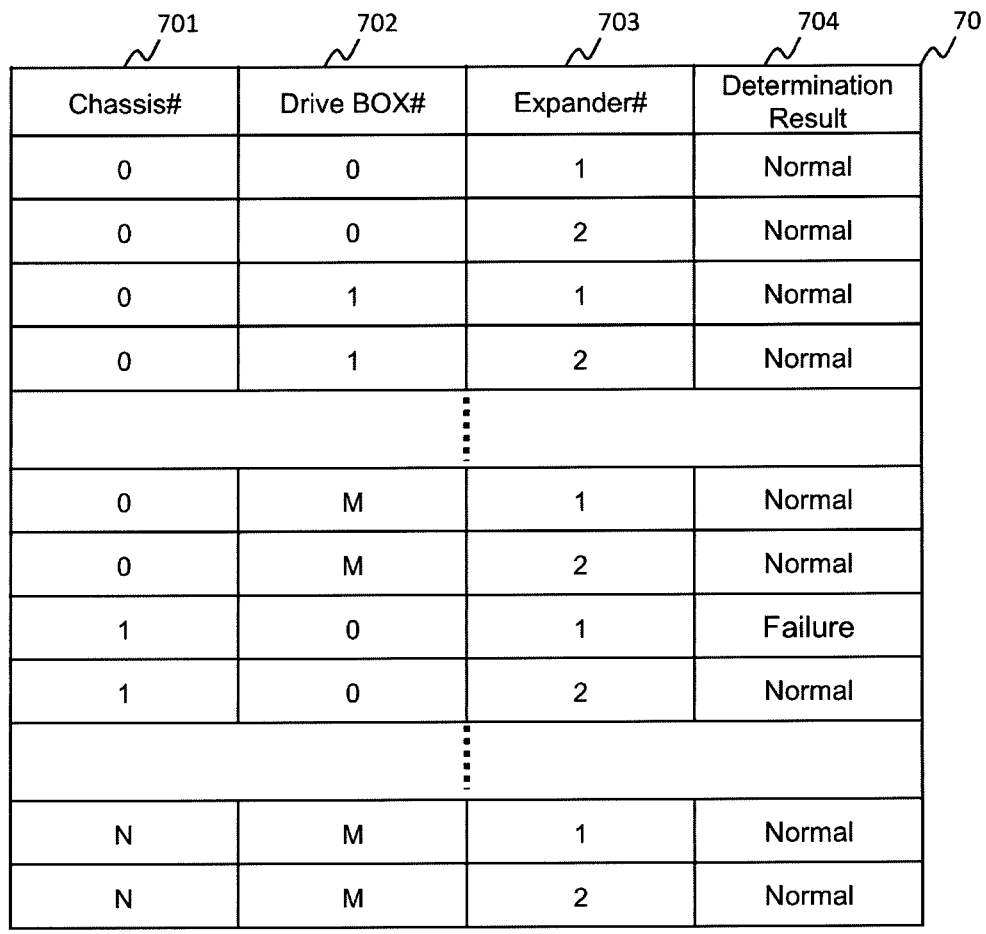
FIG. 7 is a configuration diagram of a failure determination table for managing the acquired failure information.

Incidentally, the acquired failure information together with the chassis #, the drive box # and the EXP # is managed as the failure determination table shown in FIG. 7.

<Failure Determination Table>

FIG. 7 is a configuration diagram of the failure determination table for managing the acquired failure information. The failure determination table 70 is stored in the CM 22, referred to by the MP 23 arbitrarily, and used for various processes.

The failure determination table 70 is composed of a chassis #701, a drive box #702, an EXP #703, and a determination result 704.

The chassis #701, the drive box #702 and the EXP #703 store numbers for identifying the various configuration elements.

The determination result 704 stores four status information, which are "normal", "failure", "disabled" and "status unknown", indicating the status of each EXP.

Since failure has occurred to EXP-101 3101 according to the process of confirming the failure section during occurrence of failure of FIG. 6, the failure determination table 70 stores "failure" as the determination result 704 corresponding to EXP-101. Thus, "failure" is stored in the field of the determination result 704 in which the chassis #701 is "1", the drive box #702 is "0" and the EXP #703 is "1".

Figure 8:
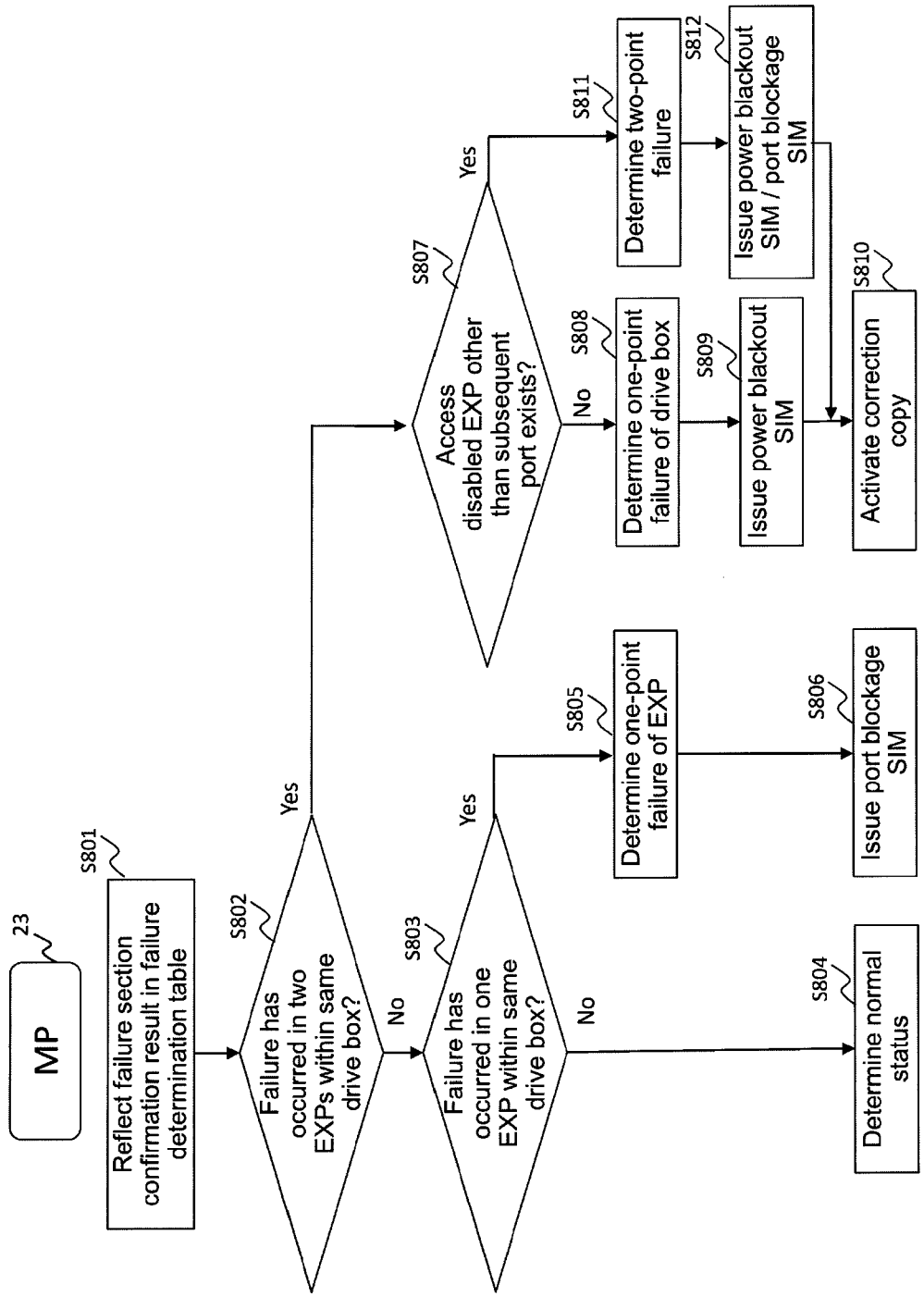
FIG. 8 is a flowchart showing a process of failure determination and failure correspondence operation when failure occurs.

MP 23 refers to the failure determination table 70, and executes the failure determination and correspondence operations according to the failure determination process showed in FIG. 8.

<Failure Determination/Failure Correspondence Processing>

FIG. 8 is a flowchart showing the process of failure determination and failure correspondence operation when failure occurs.

In S801, the MP 23 reflects the result of confirmation of the failure section which is the failure information from the CTL 24 in the process of S602 in FIG. 6 to the failure determination table 70. For example, the MP 23 updates the failure determination table 70 by setting the result of determination of the failure-occurrence EXP-101 as mentioned earlier to "failure" and the other EXPs to "normal".

In S802, the MP 23 determines based on the failure determination table 70 whether a failure has occurred in two EXPs within the same drive box. If failure has occurred (S802: Yes), the MP 23 executes S807, and if failure has not occurred (S802: No), the MP 23 executes S803.

In S803, the MP 23 determines whether a failure has occurred in only a single EXP within the same drive box. If failure has occurred (S803: Yes), the MP 23 executes S805, and if failure has not occurred (S803: No), the MP 23 executes S804.

In S804, the MP 23 determines that the two EXPs within the same drive box are in normal state.

In S805, the MP 23 determines that the failure is a one-point failure of EXP in which a failure has occurred in only one EXP, and in S806, the MP issues a port blocked SIM (Service Information Message) to the management terminal 25, and reports the failure information including the physical location information such as the port number.

When failure has occurred to two EXPs within the same drive box (S802: Yes), the MP 23 determines in S807 based on the failure determination table 70 whether an access-disabled EXP other than the port of the EXP connected to the subsequent stage of the EXP in which failure has occurred exists or not.

When an access disabled EXP exists (S807: Yes), the MP 23 executes S811, and if not (S807: No), the MP 23 executes S808.

In S808, the MP 23 determines that the failure is a one-point failure of the drive box, issues a power blackout SIM to the management terminal 25 in S809, and reports the failure information including the physical position information such as the drive box number.

In S810, the MP 23 activates correction copy.

If an access disabled EXP exists (S807: Yes), the MP 23 determines in S811 that the failure is a two-point failure.

In S812, the MP 23 issues a power blackout SIM and a port blocked SIM to the management terminal 25. Then, in S810, the MP 23 activates correction copy.

According to the processes of the above-mentioned failure determination and failure correspondence operation when failure occurs, the failure section and the failure contents can be comprehended via the displayed failure information on the management terminal, according to which the required corresponding operation such as execution of correction copy and replacement of components can be executed.

<Failure Detection According to Conventional Art Connection>

Figure 9:
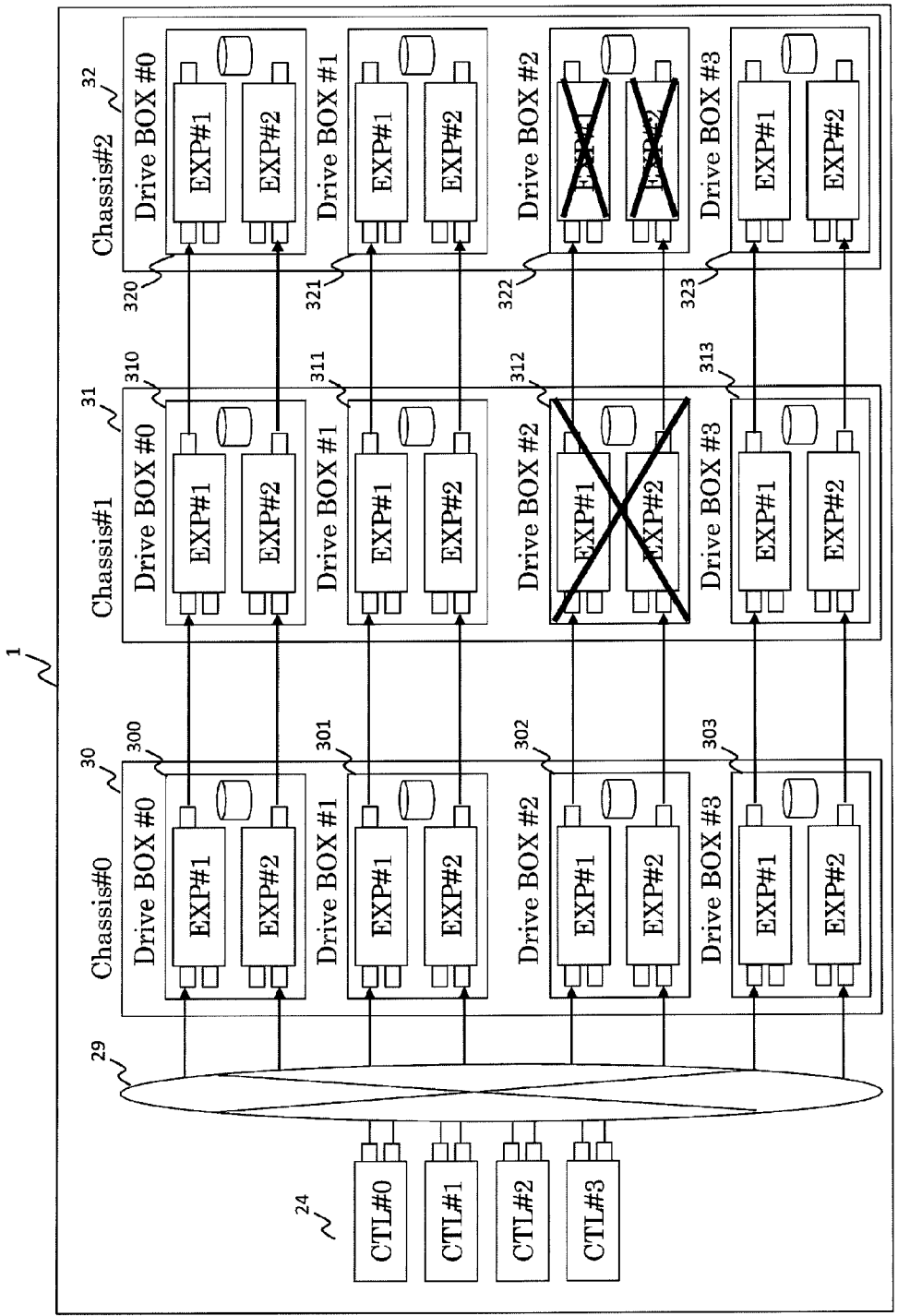
FIG. 9 is a view illustrating the failure according to a conventional art connection method.

FIG. 9 is a view illustrating the failure according to a conventional art connection method. FIG. 10 is a view illustrating the status of the failure determination table during failure according to the conventional art connection method.

FIG. 9 shows a view of a case where power blackout of drive box #2 312 of the chassis #1 31 has occurred according to the conventional art connection method 1 (FIG. 2). In this case, the CTL 24 and the MP 23 are capable of detecting the failure that has occurred in EXP #1 and EXP #2 of drive box #2 312 of the chassis #1 31.

However, since there is no accessible port in the drive box #2 322 of the chassis #2 32 connected to the subsequent stage of the chassis #1 31 in which failure has occurred, the access to both ports of EXP #1 and EXP #2 is disabled with the state of the drive box maintained to unknown.

Therefore, the CTL 24 and the MP 23 cannot determine whether there is failure in the drive box #2 322 until the failure of the drive box #2 312 of the chassis #1 31 of the former stage is recovered.

The state of the failure determination table 70a in the present failure case is illustrated in FIG. 10. Since the occurrence of failure of EXP #1 and EXP #2 of drive box #2 312 of chassis #1 31 is detectable, the determination result 704 is set to "failure".

On the other hand, the determination results 704 of EXP #1 and EXP #2 of the drive box #2 322 in the subsequently arranged chassis #2 are set to "status unknown" and "disabled".

<<Path Connection Method 1>>
<Connection Method>

The outline of the disk array system using the first path connection method for narrowing the failure range has been described with reference to FIG. 1

That is, upon connecting the drive boxes of chassis #N and chassis #(N+1), the connection destination of EXP #1 and EXP #2 are changed so as to enhance the failure tolerance. Upon connecting the drive box belonging to chassis #N to the drive box belonging to chassis #(N+1), the connection of EXP #1 is performed by connecting in a cascade the drive boxes #L having the same box numbers. L is a value of 0 to 3.

In the connection of EXP #2, the drive box #3 belonging to chassis #N is connected to the drive box #0 belonging to chassis #(N+1), and the mutual connection of EXP #2 other than that mentioned above is performed by connecting the drive box #M belonging to chassis #N to the drive box #(M+1) belonging to chassis #(N+1). M is a value of 0 to 2.

<Failure Detection>

In the path connection method, the operation for detecting failure where power blackout occurs to drive box #2 312 of chassis #1 31, which is the same failure as FIG. 9, will be described.

<One-Point Failure Detection>

Figure 11:
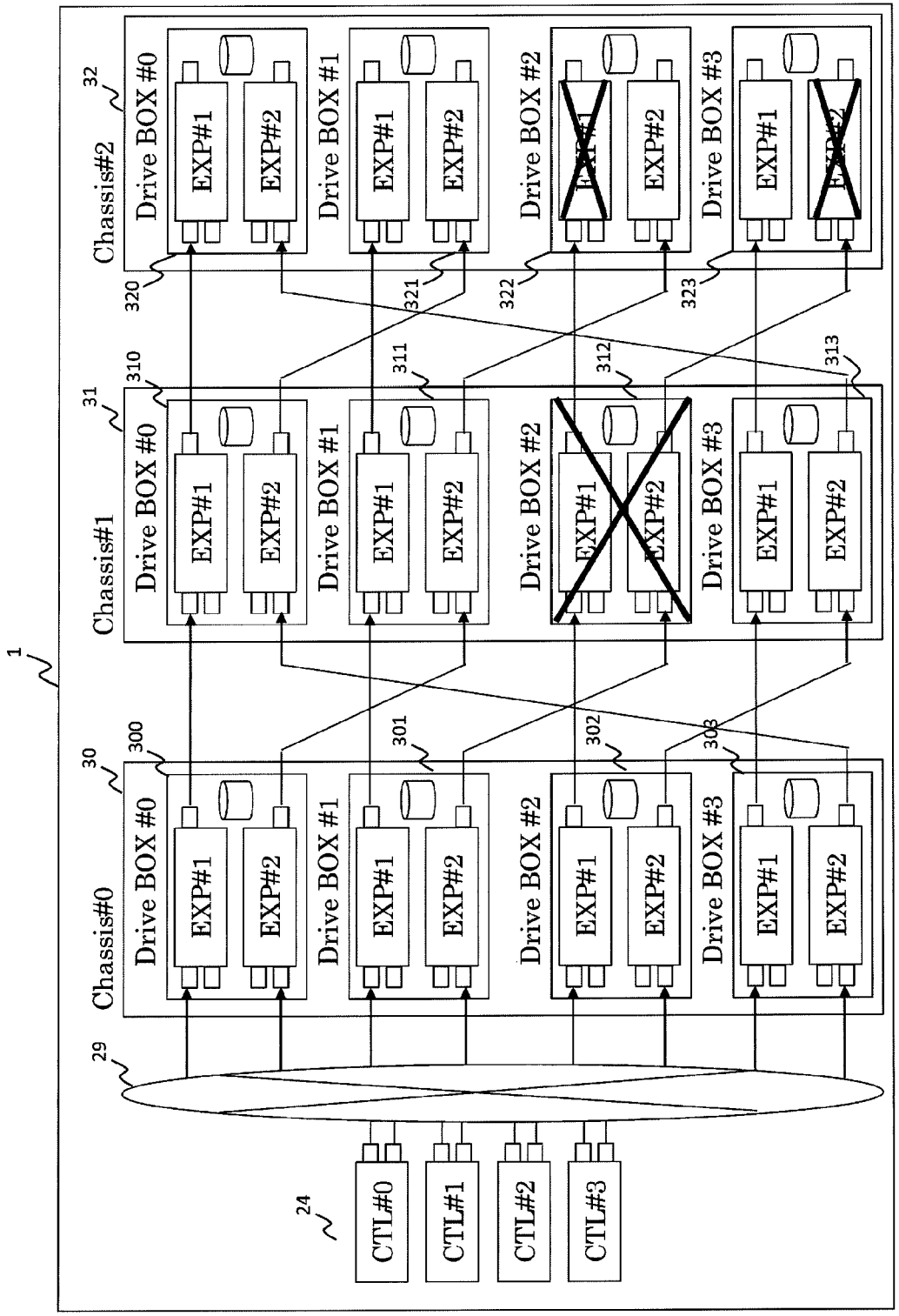
FIG. 11 is a view illustrating a one-point failure according to a first path connection method for narrowing the failure range.

FIG. 11 is a view showing a one-point failure according to a first path connection method for narrowing the failure range. FIG. 12 is a view showing the status of the failure determination table when one-point failure occurs in the first path connection method for narrowing the failure range.

In the case of FIG. 11, the CTL 24 and the MP 23 detects the occurrence of failure of EXP #1 and EXP #2 of the drive box #2 312 in chassis #1 31 due to power blackout.

Thereafter, the port of the drive box arranged subsequently and connected to the EXP #1 and EXP #2 of the drive box #2 312 in chassis #1 31 is blocked by the CTL 24. In other words, the EXP #1 of the drive box #2 322 and the EXP #2 of the drive box #3 323 of chassis #2 32 are blocked via CTL 24.

The port not being blocked out of the ports accessing the drive box arranged subsequently from the drive box in which failure has occurred can be accessed. In other words, the EXP #2 of the drive box #2 322 in chassis #2 32 and the EXP #1 of the drive box #3 323 in chassis #2 32 can be accessed by the CTL 24 via the upper level EXPs.

Therefore, the drive box failure in which both ports are blocked is restricted to the drive box #2 312 in chassis #1 31.

Furthermore, the CTL 24 can comprehend the state of the anomaly EXP and the states of two ports on the right side (subsequent stage side) of the drive box #2 312 in chassis #1 31 in which failure has occurred, using the normal EXP within the drive box having the anomaly EXP. In other words, the EXP #2 of the drive box #2 322 in chassis #2 32 can comprehend (check) the status of EXP #1, and the EXP #1 of drive box #3 323 in chassis #2 32 can comprehend the status of EXP #2.

Furthermore, the CTL 24 can comprehend the statuses of two ports on the left side (former stage side) of the drive box #2 312 in chassis #1 31 in which failure has occurred by using the EXP #2 of the drive box #1 301 and the EXP #1 of the drive box #2 302 in the chassis #0 30 on the former stage.

Therefore, the CTL 24 and the MP 23 can pinpoint where the failure has occurred in the relevant drive box by confirming that the four ports connected before and after the drive box #2 312 in chassis #1 31 are blocked.

The status of the failure determination table in the present case of failure is illustrated in FIG. 12. In the failure determination table 70b, the statuses of the EXP #1 of the drive box #2 322 and the EXP #2 of the drive box #3 323 in chassis #2 32 which are connected to the subsequent stage of the drive box #2 312 in chassis #1 31 where failure has occurred can be precisely determined as "disabled" as according to the determination result 704 by CTL 24 and MP 23.

<Two-Point Failure Detection>

Figure 13:
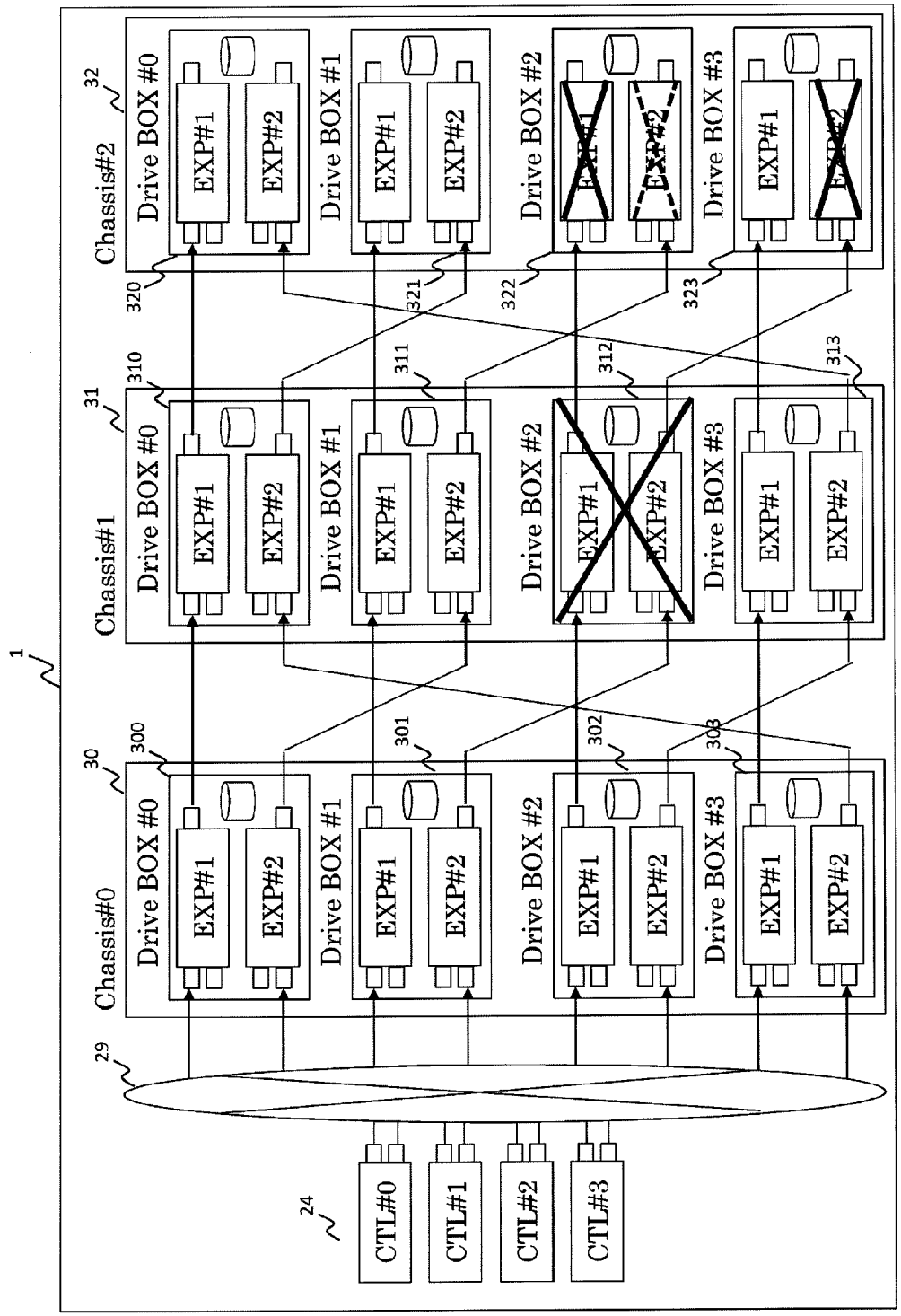
FIG. 13 is a view illustrating a two-point failure according to the first path connection method for narrowing the failure range.

FIG. 13 is a view illustrating a two-point failure according to the first path connection method for narrowing the failure range. FIG. 14 is a view illustrating the state of the failure determination table when two-point failure has occurred in the first path connection method for narrowing the failure range.

FIG. 13 illustrates the state of two-point failure in which the EXP #2 of drive box #2 322 in chassis #2 (area denoted by dotted line cross) is blocked by failure during the state shown in FIG. 11 where the drive box #2 312 of chassis #1 31 (area denoted by solid line cross) is experiencing power blackout.

The CTL 24 can detect failure of the EXP #2 of the drive box #2 322 in chassis #2 32 (area denoted by dotted line cross) by using the EXP #2 of the drive box #1 311 in chassis #1 31 connected to the former stage and the EXP #2 of the drive box #3 in chassis #3 connected to the latter stage, although not shown.

The CTL 24 having detected the failure sends the failure information to the MP 23, and the MP 23 updates the failure determination table 70. The status of the failure determination table 70c according to this case is illustrated in FIG. 14.

The difference between the failure determination table 70c and the failure determination table 70b showing a one-point failure prior to occurrence of a two-point failure is that the MP 23 has correctly updated the determination result 704 of the EXP #2 of the drive box #2 322 in the chassis #2 32 from "normal" to "failure". As described, the disk controller section 2 is capable of detecting the two-point failure that has occurred in the disk unit section 3 and the precise comprehension of the failure sections.

Figure 15:
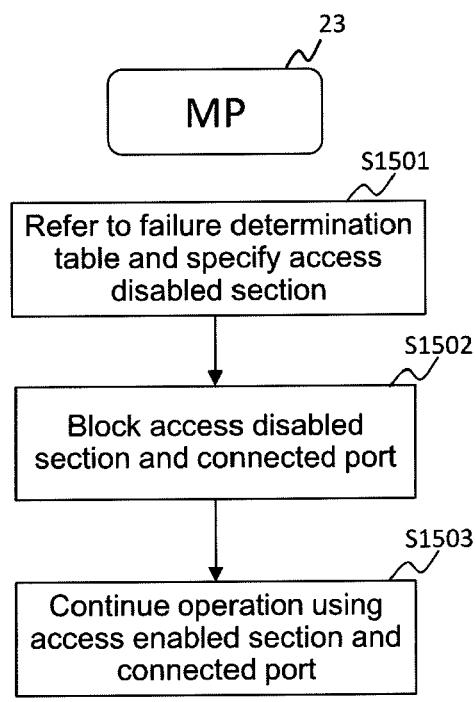
FIG. 15 is a flowchart showing a port blockage processing when failure occurs.

Lastly, when failure is detected, the MP 23 (or the CTL 24) can block the port in the section where failure has occurred due to the port blockage processing showed in FIG. 15.

<Port Blockage Processing>

FIG. 15 is a flowchart showing the port blockage processing when failure has occurred.

After confirming the port with respect to the section where access is disabled from the failure determination table 70, the MP 23 blocks the corresponding port. Thereafter, if a port capable of being accessed exists in the subsequent stage, the MP 23 (or the CTL 24) uses that port to continue operation.

That is, in S1501, the MP 23 (or the CTL 24) refers to the failure determination table 70 and specifies the section where access is disabled.

In S1502, the MP 23 (or the CTL 24) blocks the port to be connected with the section where access is disabled.

In S1503, the MP 23 (or the CTL 24) uses the port capable of being accessed to continue the access operation to the storage drive, if a port capable of being accessed exists in the drive box arranged subsequently from the section where access is disabled.

In the case of FIG. 11, the MP 23 (or the CTL 24) blocks the EXP #1 and EXP #2 of the drive box #2 312 in chassis #1 31, the EXP #1 of the drive box #2 322 in chassis #2 32, and the EXP #2 of the drive box #3 323 in chassis #2 32.

However, the EXP #2 of the drive box #2 322 in chassis #2 32 continues the access operation from the MP 23 (or the CTL 24) using the EXP #2 of the drive box #1 311 in chassis #1 31.

Similarly, the EXP #1 of the drive box #3 323 in chassis #2 32 also continues the access operation from the MP 23 (or the CTL 24) using the EXP #1 of the drive box #3 313 in chassis #1 31.

<Merit>

Next, the merit of the first path connection method for narrowing the failure range according to the present invention will be described. The first path connection method for narrowing the failure range shown in FIG. 11 (similarly shown in FIG. 1) has the following merits (1) to (7) when power blackout of a single drive box occurs compared to the path connection method of the conventional art illustrated in FIG. 2 and FIG. 3.

(1) There is no section where failure recovery based on RAID groups is impossible.

In the conventional art path connection method illustrated in FIG. 9, when RAID5 (7D+1P) is composed via drive boxes in chassis #1 31 and chassis #2 32, if the drive box disposed in a former stage than the chassis #2 32 is blocked due to power blackout or the like caused by the failure of the power supply unit, all the drive boxes connected subsequently from the drive box in which failure has occurred are blocked.

That is, when the drive box #2 312 in the chassis #1 31 is blocked due to power blackout or the like, the drive box #2 322 in chassis #2 32 arranged subsequently is also blocked. Although not shown, if the chassis of unit N is connected in a cascade, all the drive boxes #2 in the chassis disposed from the third stage to the Nth stage will be blocked and disabled even if they do not have any failure.

Therefore, 2D, that is, two drives, are disabled in the RAID group including the drive box in which failure has occurred and all the RAID groups arranged subsequently therefrom, and failure recovery based on RAID groups becomes impossible.

However, according to the first path connection method for narrowing the failure range illustrated in FIG. 11, the section in which the whole drive box is blocked is restricted to only the drive box #2 312 in chassis #1 31. Therefore, only 1D, that is, a single drive is disabled in the RAID group including the drive box in which failure has occurred and all the RAID groups arranged subsequently therefrom, so that failure recovery based on RAID groups will not be impossible.

(2) The range of deterioration of failure tolerance of RAID groups is restricted.

According to the conventional art path connection method illustrated in FIG. 9 having a RAID5 (3D+1P) configuration of drive boxes #0 to #3, if a single drive box is blocked due to power blackout or the like, all the drive boxes connected subsequently to the drive box in which failure has occurred are blocked.

Therefore, 1D, that is, a single storage drive will be disabled in the RAID group including the drive box in which failure has occurred and all the RAID groups arranged subsequently therefrom, according to which the RAID-group-level failure tolerance is lost.

However, according to the first path connection method for narrowing the failure range of FIG. 11, the drive box connected to a subsequent stage of the drive box in which failure has occurred is not blocked.

Therefore, only a single storage drive of the RAID group including the drive box in which failure has occurred is disabled, and the storage drives are not disabled in all RAID groups arranged subsequently therefrom. Therefore, the range of deterioration of failure tolerance based on RAID group levels is restricted to only the RAID group including the drive box in which failure has occurred, and the influence is not spread so as to deteriorate the failure tolerance of all RAID groups.

(3) The range of deterioration of performance caused by failure disk recovery process is restricted.

According to the conventional art path connection method illustrated in FIG. 9, upon performing recovery of failure described in (2), a failure recovery process (correction copy) is required in the RAID group including the drive box in which failure has occurred and all the RAID groups arranged subsequently therefrom, so that the access performance is deteriorated.

According to the first path connection method for narrowing the failure range of FIG. 11, only the RAID group including the drive box in which failure has occurred requires the failure recovery process (correction copy). However, in all the subsequently arranged RAID groups, there will not be any section in which the whole drive box is blocked (disabled). Therefore, the RAID groups do not require the failure recovery process (correction copy), and the deterioration of access performance can be reduced. In other words, the range in which the access performance is deteriorated due the failure disk recovery process is restricted.

(4) The number of drive boxes allocated to spare disks is reduced.

According to the conventional art path connection method illustrated in FIG. 9, upon performing recovery of failure described in (2), the failure recovery process (correction copy) is required in the RAID group including the drive box in which failure has occurred and all the RAID groups arranged subsequently therefrom, so that a corresponding amount of drive boxes must be allocated to spare disks.

According to the first path connection method for narrowing the failure range of FIG. 11, the range in which the access performance is deteriorated by the failure disk recovery process is restricted as described in (3), so that the amount of spare disks can be cut down corresponding to that restricted range.

(5) No special process is required for accessing the drive box arranged subsequently from the drive box in which failure has occurred.

According to the conventional art path connection method illustrated in FIG. 9, the drive box in which failure has occurred must be replaced in order to recover the access to the drive box arranged subsequently from the drive box in which failure has occurred.

However, according to the first path connection method for narrowing the failure range illustrated in FIG. 11, no special process is required for accessing the drive box, since access through other normal drive boxes is possible.

(6) It is possible to pinpoint the drive box in which failure has occurred.

According to the first path connection method for narrowing the failure range of FIG. 11, the CTL 24 can pinpoint that the failure has occurred in a certain drive box by confirming that the four ports connected before and after the drive box in which failure has occurred are blocked.

(7) It is possible to detect a two-point failure that has occurred in a subsequent stage of the drive box in which failure has occurred.

As shown in FIG. 13, according to the first path connection method for narrowing the failure range of the present invention, since the CTL 24 is capable of confirming the failure having occurred in the subsequent stage of the drive box in which failure has occurred through other normal drive boxes, two-point failure can be detected.

That is, according to the conventional art configuration, the subsequently arranged drive boxes cannot be accessed, so that it was not possible to detect any failure occurring therein, but according to the present arrangement, a two-point failure can also be detected in which a failure occurs to the subsequently-arranged drive box.

<<Path Connection Method 2>>
<Connection Method>

Figure 16:
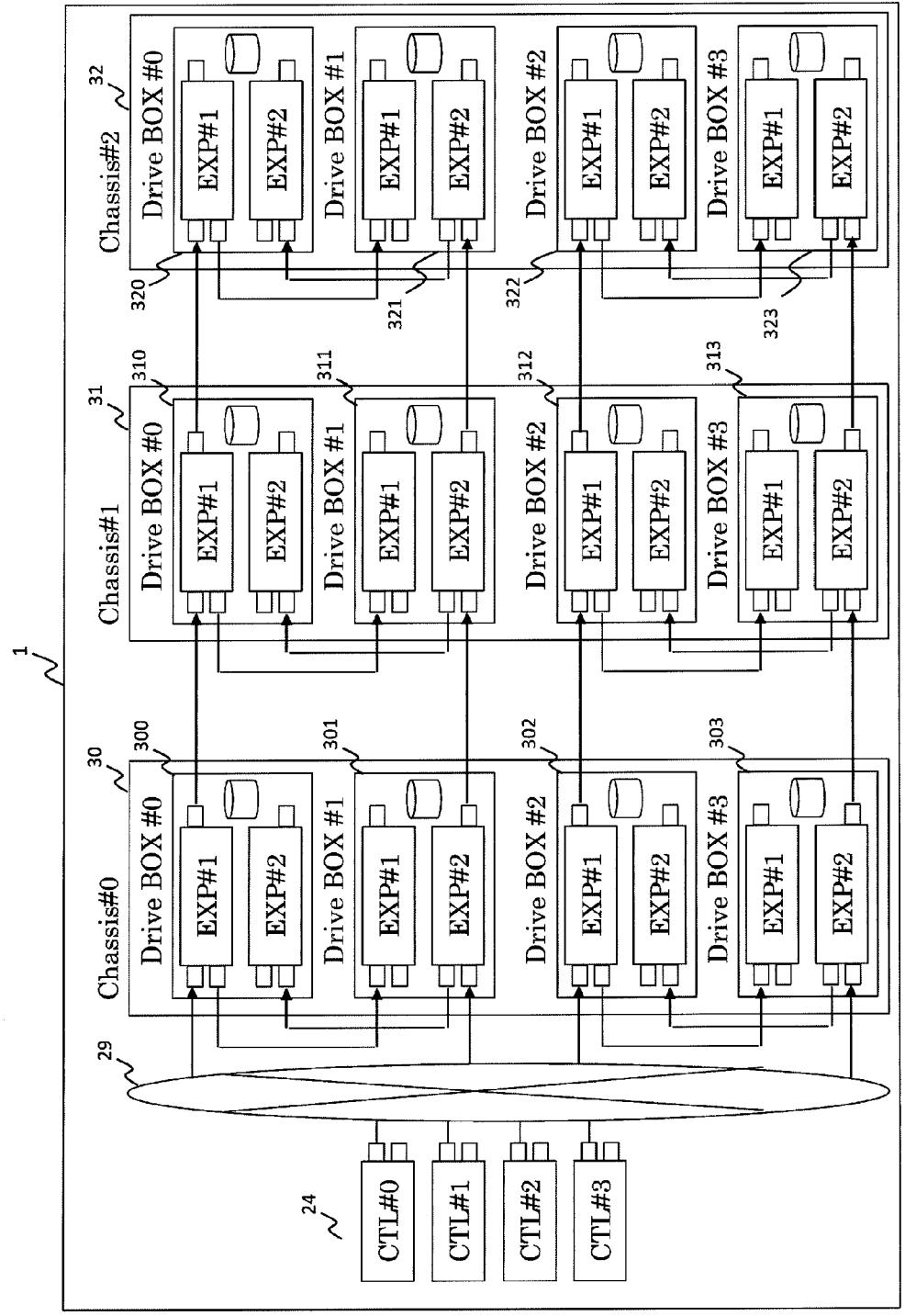
FIG. 16 is a view illustrating a second path connection method for narrowing the failure range.

FIG. 16 is a view illustrating the second path connection method for narrowing the failure range.

<CTL-EXP Connection>

According to the second path connection method for narrowing the failure range illustrated in FIG. 16, the number of connections from the CTL 24 to the chassis (or the drive box) are reduced from 8 to 4, so as to connect the CTL 24 and the drive boxes within chassis #0 30 in the first stage via four paths.

For example, the CTL #0 is connected to the EXP #1 of the drive box #0 300 in chassis #0 30. Similarly, the CTL #1 is connected to the EXP #2 of the drive box #1 301, the CTL #2 is connected to the EXP #1 of the drive box #2 302, and the CTL #3 is connected to the EXP #2 of the drive box #3 303.

<EXP-EXP Connection within Same Chassis>

The drive box #L is connected to the drive box #(L+1) within chassis #0 30 on the first stage. L is 0 or an even number of 2 or greater.

That is, the EXP #1 of the drive box #0 300 and the EXP #1 of the drive box #1 301 within chassis #0 30 are connected. Similarly, the EXP #2 of the drive box #0 300 and the EXP #2 of the drive box #1 301 within chassis #0 30 are connected.

Similarly, the EXP #1 of the drive box #2 302 and the EXP #1 of the drive box #3 303 within chassis #0 30 are connected. The EXP #2 of the drive box #2 302 and the EXP #2 of the drive box #3 303 within chassis #0 30 are also connected.

<EXP Connection Between Adjacent Chassis>

Next, the drive box #M within chassis #0 30 on the first stage (front stage) and the drive box #M within chassis #1 31 on the second stage (rear stage) are connected. M is a value selected from 0 to 3.

In other words, the EXP #1 of the drive box #0 300 within chassis #0 30 and the EXP #1 of the drive box #0 310 within chassis #1 31 are connected in a cascade.

Similarly, the EXP #2 of the drive box #1 301 is connected to the EXP #2 of the drive box #1 311, the EXP #1 of the drive box #2 302 is connected to the EXP #1 of the drive box #2 312, and the EXP #2 of the drive box #3 303 is connected to the EXP #2 of the drive box #3 313, in a cascade.

<EXP-EXP Connection within Same Chassis>

In addition, the EXPs #1 and the EXPs #2 in the drive box #0 310 and the drive box #1 311 within chassis #1 31 are mutually connected. That is, EXP #1 of the drive box #0 310 and the EXP #1 of the drive box #1 311 within chassis #1 31 are connected, and the EXP #2 of the drive box #0 310 and the EXP#2 of the drive box #1 311 within chassis #1 31 are connected. In the same connection method, the EXPs #1 and the EXPs #2 in the drive box #2 302 and the drive box #3 312 within chassis #1 31 are mutually connected.

Now, the EXP connection between former and later stage chassis as mentioned earlier and the EXP-EXP connection within the same chassis are repeatedly performed until the chassis on the final stage is connected.

<Merit>

The second path connection method for narrowing the failure range illustrated in FIG. 16 has the following merits (1) through (7) when power blackout of a single drive box occurs, compared to the conventional art path connection method illustrated in FIGS. 2 and 3.

(1) There is no section where failure recovery based on RAID groups is impossible.

Similar to the first path connection method of FIG. 11, the only section being blocked is the drive box in which power blackout occurred, and the EXPs of other drive boxes can be accessed via drive boxes other than the drive box in which failure has occurred. Therefore, failure recovery based on the RAID group including the drive box in which failure has occurred and all the RAID groups arranged subsequently therefrom will not be impossible.

(2) The range of deterioration of failure tolerance of RAID groups is restricted to a single RAID group that includes the drive box experiencing power blackout.

The illustrated path connection is designed so that the drive box in which failure has occurred does not influence the access to other normal drive boxes in the same chassis and the drive boxes of the subsequently arranged chassis. Therefore, the range in which failure tolerance is deteriorated in the RAID group is restricted to only a single RAID group including the drive box experiencing power blackout.

(3) The range in which performance is deteriorated via the failure disk recovery process is restricted to only a single RAID group including the drive box experiencing power blackout.

According to the merit of (2), the range in which performance is deteriorated by the failure disk recovery process is restricted to only a single RAID group including the drive box experiencing power blackout.

(4) The number of drive boxes being allocated to a spare disk is restricted to one.

According to the merit of (3), the range in which performance is deteriorated by the failure disk recovery process is restricted to only a single RAID group including the drive box experiencing power blackout, so that the number of drive boxes allocated to the spare disk is restricted to only one.

(5) There is no special process required for accessing the drive box arranged subsequently from the drive box in which failure has occurred.

(6) It is possible to pinpoint the drive box in which failure has occurred.

(7) It is possible to detect a two-point failure having occurred in the subsequent stage of the drive box in which failure has occurred.

The merits of (5), (6) and (7) are similar to the first path connection method illustrated in FIG. 11.

Figure 17:
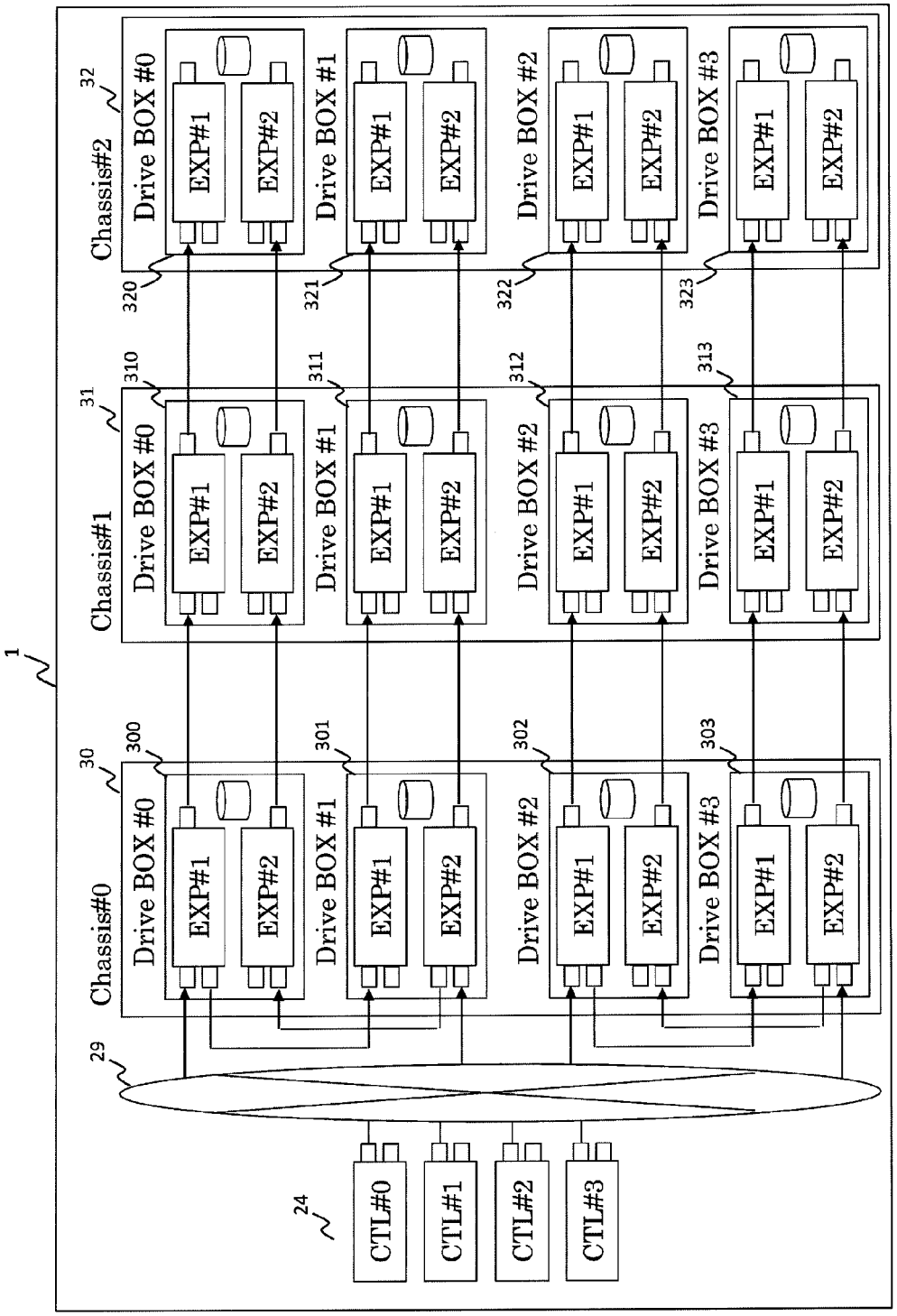
FIG. 17 is a view illustrating a third path connection method for narrowing the failure range.

<<Path Connection Method 3>>
<Connection Method>
FIG. 17 is a view illustrating a third path connection method for narrowing the failure range. This path connection method is for reducing the number of connections from the CTL 24 to the chassis (or the drive box) and to connect the drive box #M to the drive box #(M+1) within the chassis on the first stage.
<CTL-EXP Connection>
In other words, the second path connection method for narrowing the failure range according to FIG. 17 adopts a similar path connection method as the first stage (chassis #0) of FIG. 16. That is, the CTL 24 and the drive box within chassis #0 30 on the first stage are connected via four paths.

For example, the CTL #0 and the EXP #1 of the drive box #0 300 within chassis #0 30, the CTL #1 and the EXP #2 of the drive box #1 301, the CTL #2 and the EXP #1 of the drive box #2 302, and the CTL #3 and the EXP #2 of the drive box #3 303 are connected.
<EXP-EXP Connection within Same Chassis>
Further, the drive box #M and the drive box #(M+1) within chassis #0 30 on the first stage are connected. In other words, the EXPs #1 and the EXPs #2 of the drive box #0 300 and the drive box #1 301 within chassis #0 30 are mutually connected. Similarly, the EXPs #1 and the EXPs #2 of the drive box #2 302 and the drive box #3 303 within chassis #0 30 are mutually connected.
<EXP Connection Between Adjacent Chassis>
Next, the EXP #1 and the EXP #2 of the drive box #M within the chassis #0 30 in the first stage (former stage) is respectively connected in a cascade to the EXP #1 and the EXP #2 of the drive box #M within chassis #1 31 on the second stage (latter stage). M is a value from 0 to 3. This cascade connection, that is, the cascade connection of the same EXP numbers within the same drive box number are repeatedly performed until the chassis on the final stage has been connected in a cascade.
<Merit>
The third path connection method for narrowing the failure range shown in FIG. 17 has a merit in that when RAID configuration is adopted within the chassis, there is no section in which failure recovery based on RAID groups is impossible when a single drive box experiences power blackout.
<<Path Connection Method 4>>
<Connection Method>
FIG. 18 is a view illustrating the fourth path connection method for narrowing the failure range.

Figure 18:
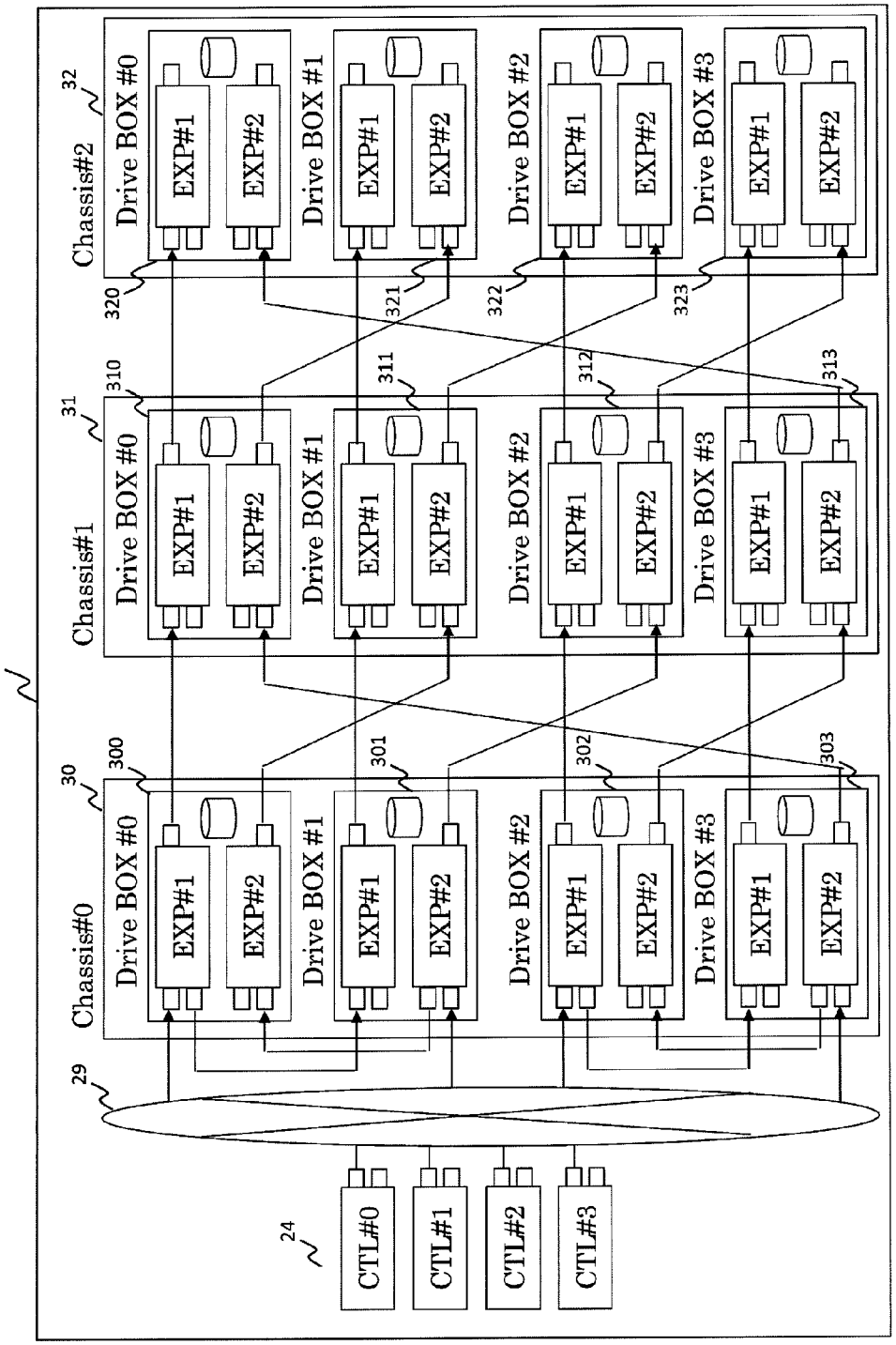
FIG. 18 is a view illustrating a fourth path connection method for narrowing the failure range.

The fourth path connection method of FIG. 18 adopts a configuration in which the number of connections from the CTL 24 to the chassis (or drive box) is reduced and the drive box #M is connected to the drive box #(M+1) within the chassis on the first stage. M is 0 or an even number of 2 or greater.
<CTL-EXP Connection>
That is, the CTL 24 is connected to the drive boxes within the first stage via four paths. For example, the CTL #0 is connected to the EXP #1 of drive box #0 300 within chassis #0 30, the CTL #1 is connected to the EXP #2 of drive box #1 301, the CTL #2 is connected to the EXP #1 of the drive box #2 302, and the CTL #3 is connected to the EXP #2 of the drive box #3 303.
<EXP-EXP Connection within Same Chassis>
The drive box #M and the drive box #(M+1) within chassis #0 30 on the first stage are connected. That is, the EXPs #1 and the EXPs #2 of the drive box #0 300 and the drive box #1 301 within chassis #0 30 are mutually connected. Similarly, the EXPs #1 and the EXPs #2 of the drive box #2 302 and the drive box #3 303 within chassis #0 30 are mutually connected.
<EXP Connection Between Adjacent Chassis>
Next, upon connecting drive boxes belonging to chassis #N to drive boxes belonging to chassis #(N+1), cascade connection is performed between drive boxes #M in connecting EXPs #1. M is a value from 0 to 3.

That is, the EXP #1 of drive box #0 300 in chassis #0 30 is connected to the EXP #1 of drive box #0 310 in chassis #1 31.

Similarly, the EXP #1 of drive box #1 301 in chassis #0 30 is connected to the EXP #1 of drive box #1 310 in chassis #1 31. Thereafter, the same cascade connection is performed until the drive box #3 303 of chassis #0 30 is connected.

In the connection of EXP #2, at first, the drive box #3 belonging to chassis #N is connected to the drive box #0 belonging to chassis #(N+1). If eight drive boxes are stored within a chassis, the drive box #7 belonging to chassis #N is connected to the drive box #0 belonging to chassis #(N+1). In other words, the EXP #2 of the drive box disposed on the bottom end of the chassis disposed on the front stage is connected to the EXP #2 of the drive box disposed on the upper end of the chassis arranged subsequently therefrom.

As for the connection of EXPs #2 other than the example described above, the drive box #M belonging to chassis #N is connected to the drive box # (M+1) belonging to chassis #(N+1).

In other words, the EXP #2 of the drive box #0 within chassis #0 is connected to the EXP #2 of the drive box #1 within chassis #1. Connection is performed in the same manner until drive box #2 of chassis #0 is connected.

Chassis #N in which the value of N is one or greater and chassis #(N+1) are connected through the same path connection as chassis #0 30 and chassis #1 31. The EXP connection between adjacent chassis is repeatedly formed until the chassis on the final stage is connected. As described, upon connecting drive boxes of chassis #N and chassis #(N+1), the failure tolerance is enhanced by changing the connection destination of EXP #1 and EXP #2.
<Merit>
Compared to the conventional art path connection method illustrated in FIG. 2 and FIG. 3, the fourth path connection method for narrowing the failure range illustrated in FIG. 18 has the following merits (1) to (7), which are similar to FIG. 11, when a single drive box experiences power blackout, compared to the conventional art path connection method illustrated in FIGS. 2 and 3.

(1) There is no section where failure recovery based on RAID groups is impossible.

(2) The range of deterioration of failure tolerance of RAID groups is restricted.

(3) The range in which performance is deteriorated via the failure disk recovery process is restricted.

(4) The number of drive boxes being allocated to a spare disk is restricted.

(5) There is no special process required for accessing the drive box arranged subsequently from the drive box in which failure has occurred.

(6) It is possible to pinpoint the drive box in which failure has occurred.

Figure 19:
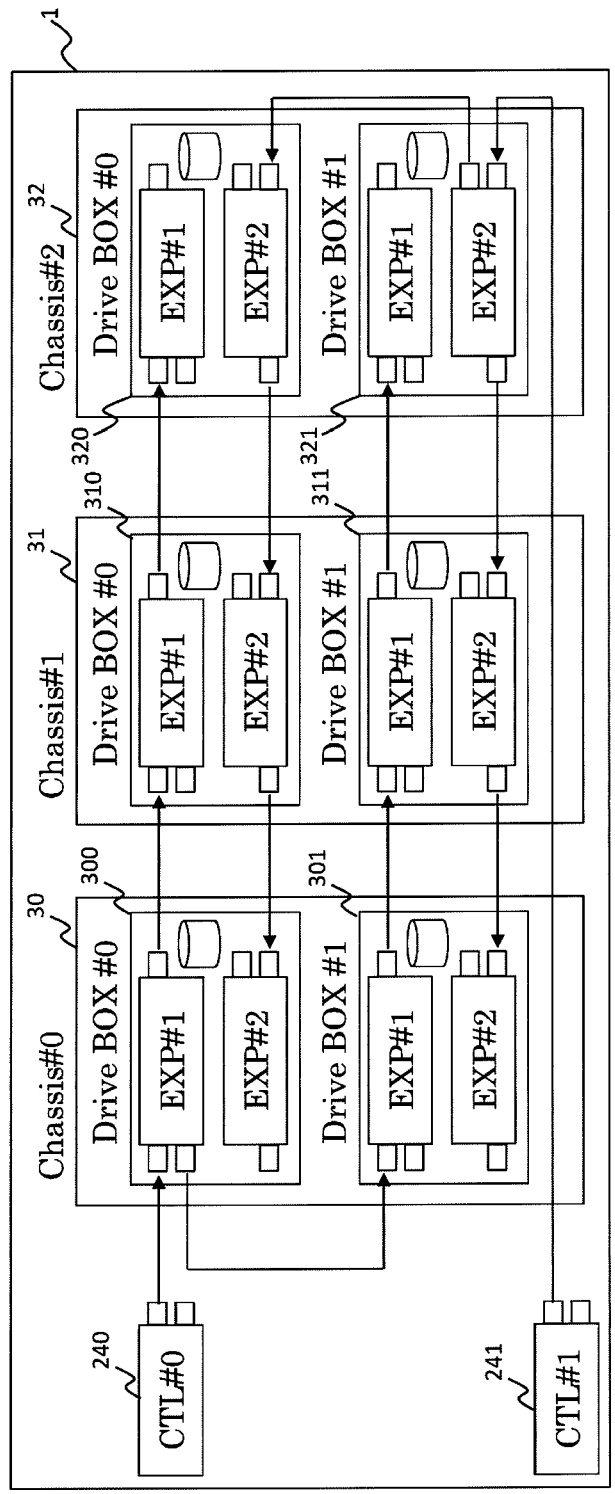
FIG. 19 is a view illustrating a fifth path connection method for narrowing the failure range.

(7) It is possible to detect a two-point failure having occurred in the subsequent stage of the drive box in which failure has occurred.
<<Path Connection Method 5>>
<Connection Method>
FIG. 19 is a view illustrating the fifth path connection method for narrowing the failure range. The fifth path connection method illustrated in FIG. 19 adopts a connection method connecting independent CTLs to the chassis on the first stage and the chassis on the last stage.

<CTL #0—EXP Connection>

The CTL #0 240 is connected to the EXP #1 of the drive box #0 300 within chassis #0 30.

<EXP-EXP Connection of Same Chassis>

Further, the EXP #1 of the drive box #0 300 is connected to the EXP #1 of the drive box #1 301 within chassis #0 30.

<EXP Connection Between Adjacent Chassis>

Further, the EXP #1 of drive box #0 300 in chassis #0 30 is connected to the EXP #1 of drive box #0 310 in the subsequently arranged chassis #1 31.

Similarly, the EXP #1 of drive box #0 310 in chassis #1 31 is connected to the EXP #1 of drive box #0 320 in chassis #2 32.

The cascade connection of the EXP #1 of drive box #0 within chassis #N and the EXP #1 of drive box #0 within chassis #(N+1) is repeated until the chassis on the final stage is connected.

Further, the EXP #1 of drive box #1 301 within chassis #0 30 is connected in a cascade to the EXP #1 of drive box #1 311 within the subsequently arranged chassis #1 31. Similarly, the EXP #1 of the drive box #1 311 within chassis #1 31 is connected to the EXP #1 of drive box #1 321 within the subsequently arranged chassis #2 32.

The connection of the EXP #1 of drive box #1 within chassis #N and the EXP #1 of drive box #1 within chassis #(N+1) is repeated until the chassis on the final stage is connected.

<CU #1—EXP Connection>

The CTL #1 241 is connected to the EXP #2 of the drive box #1 321 within chassis #N on the final stage (in FIG. 19, chassis #2 32).

<EXP-EXP Connection within Same Chassis>

Further, the EXP #2 of drive box #1 321 is connected to the EXP #2 of drive box #0 320 within chassis #2 32.

<EXP Connection Between Adjacent Chassis>

The EXP #2 of drive box #0 320 within chassis #2 32 is connected in a cascade to the EXP #2 of drive box #0 310 within chassis #1 31 of the former stage.

The cascade connection between the EXP #2 of drive box #0 within chassis #N and the EXP #2 of drive box #0 within chassis #(N−1) is repeatedly performed until the chassis on the first stage is connected.

Moreover, the EXP #2 of drive box #1 321 within chassis #2 32 is connected in a cascade to the EXP #2 of drive box #1 311 within chassis #1 31 of the former stage. The cascade connection of the EXP #2 of drive box #1 within chassis #N and the EXP #2 of drive box #1 within chassis #(N−1) is repeatedly performed until the chassis on the first stage is connected.

<Merits>

Compared to the conventional art path connection method illustrated in FIGS. 2 and 3, the fifth path connection method for narrowing the failure range illustrated in FIG. 19 has the following merits (1) to (6) when power blackout occurs to a single drive box.

(1) There is no section where failure recovery based on RAID groups is impossible.

The drive box connected to the drive box in which failure has occurred can be accessed via drive boxes of the chassis other than the chassis in which the drive box experiencing failure belongs. Therefore, there is no section where failure recovery based on RAID groups is impossible.

(2) The range of deterioration of failure tolerance of RAID groups is restricted to a single RAID group that includes the drive box experiencing power blackout.

Only the access to the drive box in which failure has occurred is disabled according to the merit described in (1). Therefore, the range in which failure tolerance is deteriorated in the RAID group is restricted to only a single RAID group including the drive box experiencing power blackout.

(3) Based on the merit described in (2), the range in which performance is deteriorated via the failure disk recovery process is restricted to only a single RAID group including the drive box experiencing power blackout.

(4) Based on the merit described in (3), the number of drive boxes being allocated to a spare disk is restricted to one.

(5) There is no special process required for accessing the drive box arranged subsequently from the drive box in which failure has occurred.

Since access is enabled via another drive box in a normal state, no special process is required upon performing access.

(6) It is possible to pinpoint the drive box in which failure has occurred.

By the CTL #0 240 or the CTL #1 241 confirming that the four ports connected before and after the drive box in which failure has occurred are blocked, it is possible to pinpoint the drive box in which failure has occurred.

If the drive box is not experiencing power blackout, the following merit (7) is achieved.

(7) It is possible to shorten the latency (response time) from the storage drive.

The CTL is capable of accessing the storage drive though both Chassis #0 and chassis #N. Thus, the number of EXPs from the CTL to the storage drive, that is, the number of stages of the EXPs, can be reduced to N/2 stages in maximum, so that the latency can be shortened.

<<Path Connection Method 6>>

<Connection Method>

Figure 20:
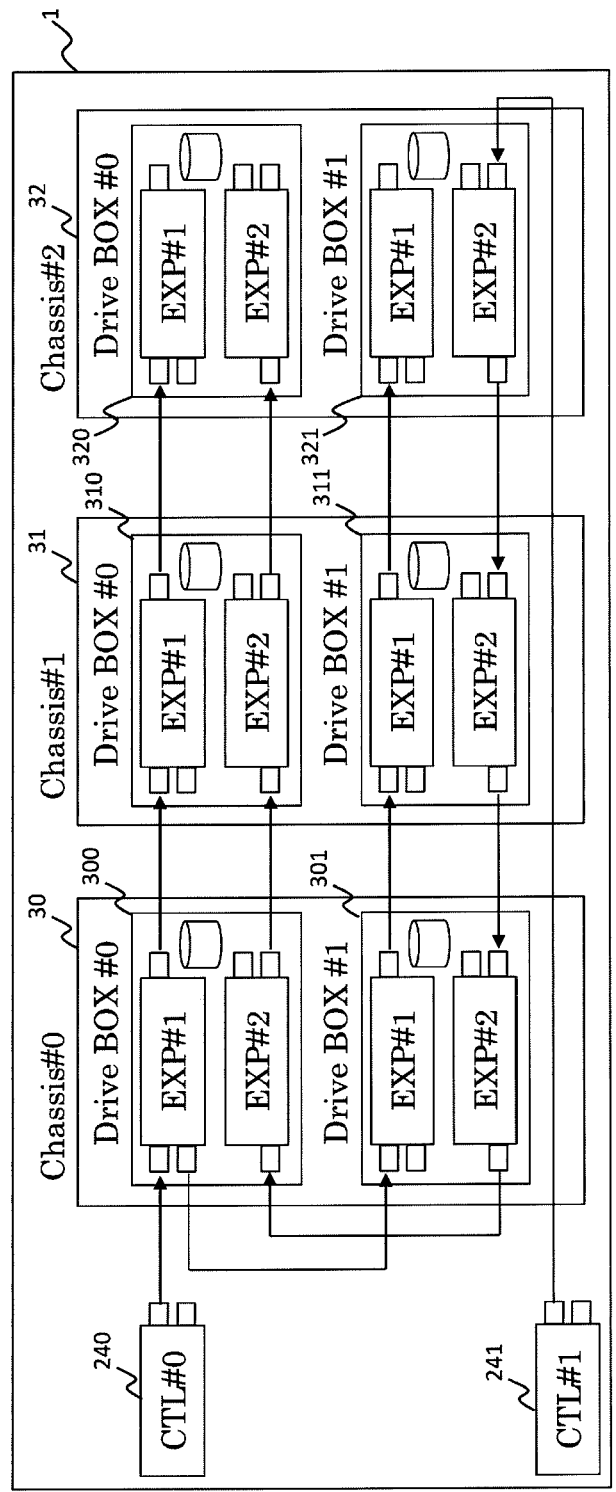
FIG. 20 is a view illustrating a sixth path connection method for narrowing the failure range.

FIG. 20 is a view illustrating a sixth path connection method for narrowing the failure range. The sixth path connection method according to FIG. 20 is a modified example of the connection method for connecting the CTL to the chassis on the first stage and the chassis on the last stage of FIG. 19. The connection of the first two EXPs #2 is performed not in the chassis on the final stage but in the chassis on the first stage.

<CTL #0—EXP Connection>

The CTL #0 240 is connected to the EXP #1 of drive box #0 300 within chassis #0 30.

<EXP-EXP Connection of Same Chassis>

The EXP #1 of drive box #0 300 is connected to the EXP #1 of drive box #1 301 within chassis #0 30.

<EXP Connection Between Adjacent Chassis>

Further, the EXP #1 of drive box #0 300 within chassis #0 30 is connected in a cascade to the EXP #1 of drive box #0 310 within chassis #1 31 arranged subsequently therefrom. The cascade connection of the EXP #1 of drive box #0 within chassis #N and the EXP #1 of drive box #0 within chassis #(N+1) is repeatedly performed until the chassis of the final stage is connected.

The EXP #1 of drive box #1 301 within chassis #0 30 is connected in a cascade to the EXP #1 of drive box #1 311 within chassis #1 31 arranged subsequently therefrom. The cascade connection of the EXP #1 of drive box #1 within chassis #N and the EXP #1 of drive box #1 within chassis #(N+1) is repeatedly performed until the chassis of the final stage is connected.

<CTL #1—EXP Connection>

The CTL #1 241 is connected to the EXP #2 of drive box #1 321 within chassis #N (chassis #2 32 in FIG. 20).

<EXP Connection Between Adjacent Chassis>

Further, the EXP #2 of drive box #1 321 within chassis #2 32 is connected to the EXP #2 of drive box #1 311 within the chassis #1 31 on the former stage. This cascade connection between the EXP #2 of drive box #1 within chassis #N and the EXP #2 of drive box #1 within chassis #(N−1) is repeatedly performed until the chassis on the first stage is connected.

<EXP-EXP Connection of Same Chassis>

Further, the EXP #2 of drive box #1 301 within chassis #0 30 is connected to the EXP #2 of the drive box #0 300 within the same chassis #0 30. This connection is different from the arrangement illustrated in FIG. 19.

<EXP Connection Between Adjacent Chassis>

In addition, the EXP #2 of drive box #0 300 within chassis #0 30 is connected in a cascade to the EXP #2 of drive box #0 310 within chassis #1 31 arranged subsequently therefrom. The cascade connection between the EXP #2 of drive box #0 within chassis #N and the EXP #2 of drive box #1 within chassis #(N+1) is repeatedly performed until the chassis of the final stage is connected.

<Merit>

Compared to the conventional art path connection method shown in FIGS. 2 and 3, the fifth path connection method for narrowing the failure range shown in FIG. 20 has the following merits (1) when power blackout occurs to a single drive box and (2) if the drive box is not experiencing power blackout.

(1) There is no section where failure recovery based on RAID groups is impossible.

The drive box connected to the drive box in which failure has occurred can be accessed via drive boxes of the chassis other than the chassis in which the drive box experiencing failure belongs. Therefore, there is no section where failure recovery based on RAID groups is impossible.

(2) The latency (response time) of the storage drive can be reduced.

The path connection method of FIG. 20 is substantially equivalent to the path connection method of FIG. 19, so that the latency of the storage drive (response time) can be reduced.

<Merits and Demerits of Respective Path Connection Methods>

FIG. 21 is a comparison view for describing the merits and demerits of each path connection method.

FIG. 21 shows the path connection methods of the present invention and the conventional art illustrated in the respective drawings, the range of influence of power blackout related thereto, the failure detection, and the difficulty level of cable routing.

The path connection method according to the present invention is capable of narrowing the range of the blocked section across all ports compared to the conventional art path connection method.

Blocking of only one of the ports is not possible according to the conventional art path connection method, but it is possible according to the present invention.

Blockage of RAID groups has occurred according to the conventional art path connection method illustrated in FIG. 3, but the occurrence of such problem can be prevented according to the path connection method of the present invention.

The path connection method according to the present invention can prevent failure of the system that had occurred according to the conventional art, and can narrow down the operation range of correction copy.

The present invention also provides a path connection method capable of pinpointing the failure and further pinpointing two-point failure which had been impossible according to the conventional art.

The path connection according to the present invention is capable of facilitating cable routing to an equivalent level or greater than the conventional art. The present cable routing enables to realize cable connection while confirming whether connection error has occurred, through determination of connection pattern and comparison processing of expected values as described later, so that the connection can be facilitated. The present invention enables to eliminate errors in cable connection.

<<Determination Method of Connection Patterns>>

As described, according to the disk array system of the present invention, there are multiple connection patterns for inter-chassis connection, inter-drive-box connection and inter-EXP connection, and it is necessary to determine which connection pattern or which combination of connection patterns is adopted, or whether the connection is performed correctly. Therefore, the present invention solves the problem through connection pattern recognition process and expected value comparison process of the connection pattern.

Figure 22:
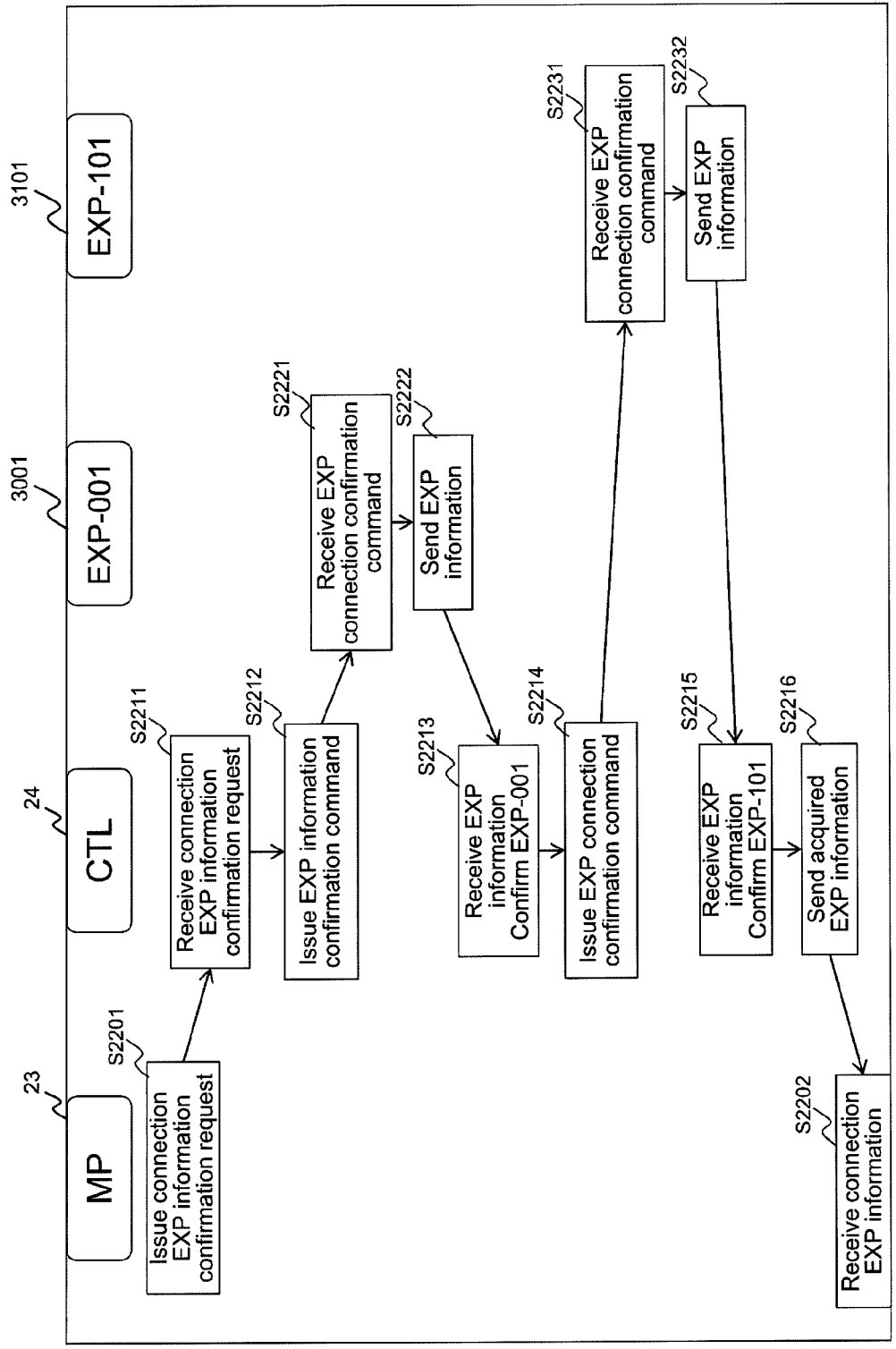
FIG. 22 is a flowchart showing the process of connection pattern recognition.

FIG. 22 is a flowchart showing a connection pattern recognition processing. FIG. 23 is a flowchart showing a comparison processing of expected values of connection patterns.

(P1) No Expected Value of Connection Pattern (FIG. 22)

If an expected value of the connection patterns is not prepared during configuration of the disk array system, the MP 23 acquires the information unique to each EXP connected to the CTL 24 (such as the SAS Address or the WWN (World Wide Name)) sequentially.

Even if the MP 23 does not recognize the physical connection pattern, failure tolerance can be acquired during occurrence of failure by connecting the CTL-EXP or inter-EXP via the path connection method of the present invention. The connection pattern recognition processing will be described with reference to FIG. 22.

In S2201, the MP 23 issues a confirmation request of the connected EXP information to the CTL 24.

In S2211, the CTL 24 receives a confirmation request of the connection EXP information from the MP 23.

In S2212, the CTL 24 issues an EXP information confirmation command with respect to EXP-001 3001.

In S2221, the EXP-001 3001 receives an EXP information confirmation command from the CTL 24.

In S2222, the EXP information of EXP-001 3001 is transmitted to CTL 24. The EXP information mentioned here is the information including the physical location information of the expander itself. For example, the EXP information of EXP-001 is "001", and this value means that the expander is arranged at a physical location in which the chassis is "0xx", the drive box is "x0x", and the EXP is "xx0".

In S2213, the CTL 24 receives the EXP information from the EXP-001 3001. Based on the EXP information from EXP-001 3001, the physical position of EXP-001 3001 can be confirmed.

In S2214, the CTL 24 issues an EXP information confirmation command with respect to EXP-101 3101.

In S2231, the EXP-101 3101 receives an EXP information confirmation command from the CTL 24.

In S2232, similar to EXP-001 3001 of S2222, the EXP information of EXP-101 3101 is transmitted to CTL 24.

In S2215, the CTL 24 receives the EXP information from the EXP-101 3101. Based on the EXP information from EXP-101 3101, the physical position of EXP-101 3101 can be confirmed.

In S2216, the CTL 24 assembles the acquired EXP information as connection EXP information and transmits the same to MP 23.

In S2202, the MP 23 receives a connection EXP information from the CTL 24.

Based on the connection EXP information acquired via the above process, the MP 23 is capable of acquiring the connection status of the disk controller section 2 to the CTL 24 and the EXP of the disk unit section 3, the mutual connection status of EXPs of the disk unit section 3, and the physical position of the EXP. In other words, the disk array system is capable of determining through the connection pattern recognition processing the path connection pattern through which the CTL-EXP and EXP-EXP are connected.

There are some cases where multiple path connection methods are adopted to connect the CTL-EXP and the EXP-EXP. For example, the EXPs from chassis #0 to chassis #3 are connected via the path connection method 2 illustrated in FIG. 16, and the EXPs from chassis #4 to chassis #7 are connected via the path connection method 4 illustrated in FIG. 18.

In the present case, even if the MP 23 does not know the path connection status in advance, the connection pattern recognition processing enables the MP 23 to recognize the combination of path connection methods being adopted to realize connection. Further, the MP 23 is capable of creating a failure determination table 70 for each path connection method, and the failure detection operation mentioned earlier (FIGS. 5, 6, 8) can be executed for each path connection.

Further according to the connection pattern recognition processing, in addition to the detection of normal connection, when failure determination tables are prepared for each connection pattern, it is possible to determine which connection patterns are used for connection and which failure determination table is to be used.

(P2) Expected Value of Connection Pattern Exists (FIG. 23)

During configuration of the disk array system, the MP 23 can determine the expected value of the connection pattern using the physical position information of the EXP being recognized. Unique information including the physical position information of each EXP connected to the CTL 24 (such as the SAS address) are acquired sequentially, the information is compared with the expected value of the connection pattern, and if they correspond, the connection pattern is recognized. If they do not correspond, the EXP that differs from the expected value is designated, and the confirmation of connection method is encouraged.

In S2301, the MP 23 compares the expected value of the connection order recognized when constituting the disk array system and the connected EXP information acquired via the connection pattern recognition processing of FIG. 22.

In S2302, the MP 23 determines whether the connection order recognized during configuration of the disk array system corresponds with the connection order acquired via the connection pattern recognition processing.

If they correspond (S2302: Yes), in S2303, the MP 23 determines that the connection between the CTL 24 of the disk controller section 2 and the EXP of the disk unit section 3, and the connection between EXPs of the disk unit section 3, are in normal states.

Then, the MP 23 sends a notice to the management terminal 25 notifying that the connection is normal. The management terminal 25 notifies the user or the system administrator that the system is operating normally by displaying the received normal notice via a display (not shown) or the like.

If the connection sequence when the disk array system was composed and the connection sequence in the connection pattern recognition processing do not correspond (S2302: No), the MP 23 determines that the connection is inconsistent.

Then, in S2304, the MP 23 sends the inconsistent connection section to the management terminal 25. The management terminal 25 displays the received inconsistent connection section on a screen or the like to notify the same to the user or the system administrator.

Further, if the connection pattern is recognized by the MP 23 as mentioned earlier, the process for automatically allocating the EXP number indicating the physical position of the EXP when the drive box is connected to the chassis can be implemented in the connection pattern recognition processing shown in FIG. 22 or the connection pattern expected value comparison processing of FIG. 23, to thereby improve the usability thereof.

The above-described connection pattern recognition processing enables the connection status to be recognized and to prompt the user or the system administrator to confirm the connection status by notifying the abnormal connection status recognized via the comparison processing of expected values of connection patterns. Thus, it becomes possible to achieve the expected failure tolerance in a disk array system.

The failure tolerance, the reliability and the availability of the whole disk array system can be enhanced via the above-described path connection method, failure detection operation and connection pattern recognition operation. In the description, the number of CTLs is mainly four, the number of chassis is mainly three, the number of drive boxes in a chassis is mainly four, and the number of EXPs in a drive box is mainly two, but the numbers are not restricted thereto. The connection configuration can be realized via various combinations of numeric values.

The present invention is not restricted to the embodiments mentioned above, and other various modified examples are included in the scope of the invention. The preferred embodiments of the present invention have been merely illustrated for better understanding of the present invention, and not necessarily all the components illustrated in the present description are required.

A portion of the configuration of an embodiment can be replaced with the configuration of another embodiment, or the configuration of an embodiment can be added to the configuration of another embodiment. Moreover, all portions of the configurations of the respective embodiments can have other configurations added thereto, deleted therefrom, or replaced therewith.

Moreover, a portion or all of the configurations, functions, processing units, processing means and the like described in the description can be realized by hardware such as by designed integrated circuits. The respective configurations, functions and the like can also be realized by software such as by having a processor interpret the program for realizing the respective functions and through execution of the same.

The information such as the programs, tables, files and the like for realizing the respective functions can be stored in storage devices such as memories, hard disks and SSDs (Solid State Drives), or in storage media such as IC cards, SD cards and DVDs.

The control lines and information lines considered necessary for description are illustrated, and not all the control lines and information lines required for production are illustrated. Actually, it can be considered that almost all components are mutually connected.

1 Disk array system
2 Disk controller section
3 Disk unit section
23 MP
24, 240, 241 CTL
30, 39 Chassis
300, 309, 390, 399 Drive box
3001, 3091, 3901, 3991 EXP
3002, 3092, 3902, 3992 EXP
3003, 3093, 3903, 3993 Storage drive unit

The invention claimed is:

1. A disk array system connected to a host computer, the system comprising:
   a controller unit having a plurality of redundant controllers; and
   a storage unit having a plurality of disk unit chassis connected in daisy chain mode, each chassis storing a plurality of drive boxes having a plurality of redundant expanders;
   wherein out of the plurality of disk unit chassis, the first disk unit chassis stores a first drive box, and a second disk unit chassis stores a second drive box and a third drive box; and
   out of a plurality of expander controllers in the first drive box, one expander controller is connected to an expander controller in the second drive box, and the other expander controller is connected to an expander controller in the third drive box.

2. The disk array system according to claim 1, wherein a first disk unit chassis out of the plurality of disk unit chassis stores a fourth drive box; and
   out of the plurality of expander controllers in the fourth drive box, one expander controller is connected to an expander controller in the second drive box.

3. The disk array system according to claim 1, wherein a first disk unit chassis out of the plurality of disk unit chassis stores a fourth drive box; and
   out of the plurality of expander controllers in the first drive box, one expander controller is connected to an expander controller in the second drive box and an expander controller in the fourth drive box.

4. The disk array system according to claim 3, wherein out of the plurality of expander controllers in the fourth drive box, one expander controller is connected to an expander controller in the third drive box and an expander controller in the first drive box.

5. The disk array system according to claim 4, wherein the other one of the plurality of expander controllers in the first drive box is connected to an expander controller in the second drive box, and the other one of the expander controllers in the fourth drive box is connected to an expander controller in the third drive box.

6. The disk array system according to claim 4, wherein out of the plurality of expander controllers in the first drive box, the other expander controller is connected to an expander controller in the third drive box, and out of the expander controllers in the fourth drive box, the other expander controller is connected to an expander controller in the second drive box.

7. A disk array system connected to a host computer, the system comprising:
   a controller unit having a plurality of redundant controllers; and
   a storage unit having a plurality of disk unit chassis connected in daisy chain mode, each chassis storing a plurality of drive boxes having a plurality of redundant expanders;
   wherein out of a plurality of disk unit chassis, a first drive box and a fourth drive box are connected to a first disk unit chassis, and a second drive box and a third drive box are connected to a second disk unit chassis;
   out of the expander controllers within the first drive box, one of the expander controllers is connected to a first controller out of the plurality of controllers, an expander controller in the fourth drive box, and an expander controller in the second drive box; and
   out of the expander controllers in the third drive box, one expander controller is connected to a second controller out of a plurality of controllers, an expander controller in the second drive box, and an expander controller in the fourth drive box.

8. The disk array system according to claim 7, wherein out of the expander controllers in the third drive box, one expander controller is connected to a second controller out of the plurality of controllers, and an expander controller in the fourth drive box, and further, an expander controller in the fourth drive box is connected to the other one of the expander controllers in the first drive box.

9. The disk array system according to claim 1, wherein the control unit issues a command to the expander controller to confirm an operation status;
   the expander controller having received the command confirming the operation status sends an operation information of the expander controller itself to the control unit; and
   the control unit confirms the operation status of the expander controller via the transmitted operation information.

10. The disk array system according to claim 9, wherein the operation information includes a chassis identification information, a drive box identification information, an expander controller identification information and a failure information.

11. The disk array system according to claim 10, wherein the connection between expander controllers is confirmed via the chassis identification information, the drive box identification information and the expander controller identification information included in the operation information.

12. A connection method for connecting a plurality of disk unit chassis in a daisy chain mode, wherein
   one of a plurality of expander controllers in a first drive box of a first disk unit chassis is connected to an expander controller in a second drive box of a second disk unit chassis; and
   the other one of the expander controllers in the first drive box of the first disk unit chassis is connected to an expander controller in a third drive box of the second disk unit chassis.

* * * * *